United States Patent
Furuta

(10) Patent No.: US 11,938,775 B2
(45) Date of Patent: Mar. 26, 2024

(54) DAMPING CONTROL SYSTEM

(71) Applicant: TOYOTA JIDOSHA KABUSHIKI KAISHA, Toyota (JP)

(72) Inventor: Hiroki Furuta, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 322 days.

(21) Appl. No.: 17/478,179

(22) Filed: Sep. 17, 2021

(65) Prior Publication Data
US 2022/0134832 A1 May 5, 2022

(30) Foreign Application Priority Data

Oct. 30, 2020 (JP) ................................. 2020-182795

(51) Int. Cl.
*B60G 17/0165* (2006.01)

(52) U.S. Cl.
CPC ...... *B60G 17/0165* (2013.01); *B60G 2204/62* (2013.01); *B60G 2400/821* (2013.01); *B60G 2600/182* (2013.01); *B60G 2800/162* (2013.01); *B60G 2800/916* (2013.01)

(58) Field of Classification Search
CPC ............ B60G 17/0165; B60G 2204/62; B60G 2400/821; B60G 2600/182; B60G 2800/162; B60G 2800/916
USPC .......................................................... 701/37
See application file for complete search history.

(56) References Cited

U.S. PATENT DOCUMENTS

| 2009/0076774 A1* | 3/2009 | Miyajima ............ G08G 1/0104 702/179 |
| 2010/0324780 A1 | 12/2010 | Koumura et al. |
| 2018/0154723 A1 | 6/2018 | Anderson et al. |
| 2019/0283520 A1* | 9/2019 | Furuta .................... B60G 17/06 |

FOREIGN PATENT DOCUMENTS

| JP | 2009-96366 A | 5/2009 |
| JP | 2014-219204 A | 11/2014 |
| JP | 2016-107778 A | 6/2016 |
| JP | 2019-82400 A | 5/2019 |
| JP | 2020-038498 A | 3/2020 |
| JP | 2020-056740 A | 4/2020 |

* cited by examiner

*Primary Examiner* — Lindsay M Low
*Assistant Examiner* — Omar Morales
(74) *Attorney, Agent, or Firm* — Sughrue Mion, PLLC

(57) ABSTRACT

A damping control system comprises a first vehicle, a second vehicle, and a storage device. The first vehicle provides, to the storage device, travel information including a change value of a road surface, position information, and position reliability of the position information. The storage device executes first update processing of updating related value information based on a road surface displacement-related value identified based on the change value, when the position reliability is equal to or higher than a threshold reliability, and executes second update processing of updating the related value information, when the position reliability is lower than the threshold reliability. The second vehicle executes preview damping control using a target control force calculated based on a control related value being a road surface displacement-related value at a predicted passing position.

7 Claims, 12 Drawing Sheets

FIRST MODIFICATION EXAMPLE

UNSPRUNG DISPLACEMENT INFORMATION

| BLOCK Gd | UNSPRUNG DISPLACEMENT $z1$ | RELIABILITY FLAG Xac |
|---|---|---|
| X1,Y1 | z1_11 | 0 |
| X1,Y2 | z1_12 | 1 |
| ... | ... | ... |
| Xm,Yn | z1_mn | 1 |

FIG.9

DAMPING CONTROL SYSTEM

TECHNICAL FIELD

The present disclosure relates to a damping control system including a first vehicle, a second vehicle, and a storage device configured to store storage information including a road surface displacement-related value, in which the storage device is configured to update related value information based on travel information obtained by the first vehicle during travel, and the second vehicle is configured to execute preview damping control based on the road surface displacement-related value obtained from the storage device.

BACKGROUND

Hitherto, there has been known a vehicle for executing preview damping control in order to damp a sprung portion of the vehicle. The preview damping control is control of generating a target control force, which is calculated based on a vertical displacement (hereinafter referred to as "road surface displacement") at a predetermined position forward of a current ground contact position of a wheel, between the wheel and a vehicle body part corresponding to the position of the wheel when the wheel passes the predetermined position.

As a vehicle of this type, there is known a vehicle (hereinafter referred to as "related-art vehicle") described in, for example, US 2018/154723. The related-art vehicle executes the preview damping control through use of data stored in a control map. The data is data formed by associating position information and a topographical altitude at a position indicated by the position information with each other. More specifically, the related-art vehicle uses a location sensor and a relative sensor to identify a current position of the vehicle.

For example, the location sensor is a GNSS receiver, and the relative sensor is an in-vehicle sensor such as an IMU, an accelerometer, a steering angle sensor, or a vehicle speed sensor. The related-art vehicle uses the identified current location of the vehicle and the control map to obtain the topographical altitude of the predetermined position forward of the current position of the vehicle, and executes the preview damping control based on the obtained topographical altitude.

The above-mentioned control map is updated based on a road surface state information indicating a road surface state obtained from a road surface when the related-art vehicle travels on the road surface.

SUMMARY

The current position of the vehicle identified by the related-art vehicle is not always accurate. However, the related-art control map is updated even when the current position of the related-art vehicle is inaccurate. As a result, there occurs such a case in which the road surface state indicated by the road surface state information stored in the control map is relatively greatly different from the original road surface state. In this case, vibration of the vehicle cannot effectively be suppressed through the preview damping control.

The present disclosure has been made in view of the above-mentioned problem. That is, one object of the present disclosure is to provide a damping control system with which a possibility of appropriate damping of a sprung portion through preview damping control executed by a vehicle is increased.

A damping control system (hereinafter referred to as "system of the present disclosure"), according to at least one embodiment of the present disclosure comprises:

a first vehicle (30A);

a second vehicle (30A or 30B), which is one of the same vehicle as the first vehicle and a vehicle different from the first vehicle; and a storage device (20, 22, 24), wherein the storage device is installed in any one of the first vehicle, the second vehicle, and a place other than the first vehicle and the second vehicle, wherein the storage device includes a related value information storage (200) configured to store related value information formed by associating a position of a road surface and a road surface displacement-related value with each other, the road surface displacement-related value being a value related to a road surface displacement, which is a displacement in a vertical direction of the road surface at the position of the road surface, wherein the first vehicle is configured to:

measure a change value being a value that changes in accordance with the road surface displacement of the road surface on which the first vehicle travels, and obtain position information indicating a measurement position being a position of the road surface at which the change value is measured and position reliability being reliability of the position information (Step 505 to Step 530); and provide, to the storage device, travel information formed by associating the change value, the position information, and the position reliability with each another (Step 615), wherein the storage device is configured to:

execute first update processing of updating the road surface displacement-related value corresponding to the measurement position of the related value information based on a road surface displacement-related value identified based on the change value of the travel information (Step 735, Step 1005), when the position reliability of the travel information is equal to or higher than a predetermined threshold reliability ("Yes" at Step 730); and execute second update processing of updating the related value information in a manner different from the manner of the first update processing (Step 1015, Step 1020), when the position reliability of the travel information is lower than the predetermined threshold reliability ("No" at Step 730), wherein the second vehicle includes a control force generation device (37) configured to generate a control force in the vertical direction for damping a sprung portion of the second vehicle such that the control force is generated between each of at least one wheel (31FL to 31RR) of the second vehicle and a vehicle body part (30a) corresponding to a position of the at least one wheel, and wherein the second vehicle is configured to:

obtain, through use of the related value information stored in the storage device, a control related value being a road surface displacement-related value at a predicted passing position, at which the at least one wheel is predicted to pass at a time when a predetermined period elapses after a current time (Step 825, Step 1105); and execute preview damping control of controlling the control force generation device based on a target control force for damping the sprung portion, which is calculated based on the control related value (Step 840).

When the position reliability of the travel information is less than the threshold reliability, it is highly likely that the current position of the vehicle is inaccurate. According to the system of the present disclosure, in this case, the storage device executes the second update processing of updating the related value information in the form different from that of the first update processing executed when the position reliability of the travel information is equal to or higher than the threshold reliability. When the related value information is updated in such a form as to reduce the degree of influence of the road surface displacement-related value, which is obtained at the inaccurate current position, on the target control force in the second update processing, it is possible to reduce the possibility that an inappropriate target control force is calculated. As a result, it is possible to provide the damping control system with which a possibility of the appropriate damping of the sprung portion through the preview damping control is increased.

In one aspect of the system of the present disclosure, the storage device is configured to avoid updating the related value information in the second update processing ("No" at Step 730).

According to the above-mentioned at least one aspect, in the second update processing, it is possible to prevent the related value information from being updated based on the road surface displacement-related value at the inaccurate current position. As a result, it is possible to reduce the possibility that the target control force is calculated based on the road surface displacement-related value relatively greatly different from the original road surface displacement-related value, and it is thus possible to increase the possibility that the sprung portion is appropriately damped through the preview damping control.

In one aspect of the system of the present disclosure, in the related value information, the road surface displacement-related value at the position of the road surface and reliability determination information (Xac), which indicates that the road surface displacement-related value has been updated based on highly reliable travel information, are associated with each other, the highly reliable travel information being travel information having the position reliability equal to or higher than the predetermined threshold reliability.

When the related value information is to be updated in the first update processing, regardless of the reliability determination information which is associated with the measurement position indicated by the position information of the travel information in the related value information, the storage device is configured to update the road surface displacement-related value of the related value information which corresponds to the measurement position, based on a road surface displacement-related value identified based on the change value of the travel information (Step 1005), and to change the reliability determination information of the related value information which corresponds to the measurement position to a value indicating that the road surface displacement-related value has been updated based on the highly reliable travel information (Step 1010).

The storage device is configured to:
determine, when the related value information is to be updated in the second update processing, whether the road surface displacement-related value of the related value information which corresponds to the measurement position has been updated based on the highly reliable travel information, through use of the reliability determination information associated with the measurement position in the related value information (Step 1015);

avoid updating the related value information, when it is determined that the road surface displacement-related value has been updated based on the highly reliable travel information ("Yes" at Step 1015); and update the road surface displacement-related value of the related value information which corresponds to the measurement position, based on the road surface displacement-related value identified based on the change value of the travel information (Step 1020), when it is determined that the road surface displacement-related value has not been updated based on the highly reliable travel information ("No" at Step 1015).

According to the at least one aspect, in the second update processing, the related value information is not updated when the road surface displacement-related value at the measurement position of the related value information has been updated based on the highly reliable travel information. As a result, the road surface displacement-related value of the related value information that has already been updated based on the highly reliable travel information is highly likely to be accurate, and this road surface displacement-related value of the related value information is thus not updated when the position reliability of the travel information is lower than the threshold reliability. With this configuration, it is possible to reduce the possibility that the accurate road surface displacement-related value of the related value information becomes inaccurate as a result of the update.

Further, in the second update processing, the related value information is updated when the road surface displacement-related value at the measurement position of the related value information has not been updated based on the highly reliable travel information. With this configuration, the road surface displacement-related value of the related value information being highly likely to be inaccurate can be updated to the latest road surface displacement-related value.

In the above aspect, in the second update processing, when it is determined that the road surface displacement-related value has not been updated based on the highly reliable travel information ("No" at Step 1015 of FIG. 10), the storage device is configured to update the road surface displacement-related value of the related value information which corresponds to the measurement position, based on a frequency component of the road surface displacement-related value identified based on the change value of the travel information (Step 1020), the frequency component being lower than a predetermined cutoff frequency.

It is highly likely that a high-frequency component of the road surface displacement-related value equal to or higher than the cutoff frequency greatly changes when the position is displaced even slightly compared with the low frequency component of the road surface displacement-related value lower than the cutoff frequency. According to the at least one aspect, in the second update processing, when the road surface displacement-related value of the related value information has not been updated based on the highly reliable travel information, the road surface displacement-related value of the related value information is updated based on the low-frequency component of the road surface displacement-related value. With this configuration, it is possible to reduce a possibility that the road surface displacement-related value of the related value information after the update greatly separates from the original road surface displacement-related value.

In the above aspect, the second vehicle is configured to:
determine whether the control related value has been updated based on the highly reliable travel information, by referring to the reliability determination information of the control related value (Step 1110);
execute first calculation processing of calculating the target control force based on at least the control related value (Step 835 of FIG. 11), when it is determined that the control related value has been updated based on the highly reliable travel information ("Yes" at Step 1110); and
execute second calculation processing of calculating the target control force so that a degree of influence of the control related value on the target control force is lower than the degree of influence in the first calculation processing (Step 850 of FIG. 11), when it is determined that the control related value has not been updated based on the highly reliable travel information ("No" at Step 1110).

According to the at least one aspect, the second vehicle calculates the target control force through the second calculation processing when the control related value has not been updated based on the highly reliable travel information. It is likely that the control related value that has not been updated based on the highly reliable travel information separates from the original road surface displacement-related value. Thus, in the second calculation processing, the target control force is calculated so that the degree of influence of the control related value on the target control force is low. With this configuration, it is possible to prevent a decrease in damping performance of the preview damping control for the sprung portion.

In the above aspect, in the first calculation processing and the second calculation processing, the second vehicle is configured to calculate the target control force by multiplying a predetermined gain and the control related value by each other (Step 835 of FIG. 11, Step 850 of FIG. 11).

The predetermined gain ow to be used in the second calculation processing is set to a value smaller than the predetermined gain ($\beta$a) to be used in the first calculation processing.

When the second calculation processing is to be executed, it is highly likely that the control related value is inaccurate. According to the at least one aspect, the gain used in the second calculation processing is set to a value smaller than the gain used in the first calculation processing. Thus, in the second calculation processing, the target control force is calculated so that the degree of influence of the control related value on the target control force is low. With this configuration, it is possible to prevent excitation of the sprung portion due to a large target control force generated based on a road surface displacement—related value being highly likely to be inaccurate. As a result, it is possible to prevent the decrease in damping performance of the preview damping control for the sprung portion.

In the above aspect, in the first calculation processing and the second calculation processing, the second vehicle is configured to calculate the target control force by adding a feedforward term and a feedback term to each other, the feedforward term being obtained by multiplying a predetermined feedforward gain and the control related value by each other, the feedback term being obtained by multiplying a predetermined feedback gain and one of an unsprung state quantity indicating a current displacement state of an unsprung portion of the second vehicle in the vertical direction and a sprung state quantity indicating a current displacement state of a sprung portion of the second vehicle in the vertical direction by each other.

The feedback gain ($\gamma$b) to be used in the second calculation processing is set to a value larger than the feedback gain ($\gamma$a) to be used in the first calculation processing.

In the first calculation processing and the second calculation processing in the at least one aspect, the target control force is calculated by adding the feedforward term and the feedback term to each other. When the second calculation processing is to be executed, the control related value is highly likely to be inaccurate, but the current unsprung state quantity or sprung state quantity does not depend on the reliability of the position, and is thus highly likely to be accurate. According to the at least one aspect, the feedback gain used in the second calculation processing is set to a value larger than the feedback gain used in the first calculation processing. With this configuration, in the second calculation processing, the magnitude of the feedback term based on the unsprung state quantity or the sprung state quantity which is highly likely to be accurate can further be increased, and it is thus possible to prevent the decrease in damping performance of the preview damping control for the sprung portion even when the control related value is inaccurate.

In the above aspect, the feedforward gain ($\beta$b) to be used in the second calculation processing is set to a value smaller than the feedforward gain ($\beta$a) to be used in the first calculation processing.

With this configuration, in the second calculation processing, the target control force is calculated so that the degree of influence of the control related value on the target control force further decreases. As a result, it is possible to prevent a decrease in damping performance of the preview damping control for the sprung portion.

In the above aspect, the second vehicle includes a planner information storage (47) configured to store planner information being information which is different from the related value information, and in which a planner position information and the road surface displacement-related value corresponding to a position indicated by the planner position information are associated with each other so that the planner information is used to determine a path on which the vehicle travels.

The second vehicle is configured to:
calculate, in the first calculation processing, the target control force based on the control related value obtained from the related value information (Step 825 of FIG. 11); and
obtain, in the second calculation processing, the road surface displacement-related value at the predicted passing position from the planner information (Step 1205), and calculate the target control force based on the obtained road surface displacement-related value (Step 1215, Step 1220).

In the second calculation processing to be executed when the control related value obtained from the related value information is highly likely to be inaccurate, the target control force is calculated based on the control related value obtained from the planner information. With this configuration, the target control force is calculated so that the degree of influence of the control related value, which is obtained from the related value information, on the target control force further decreases, and it is thus possible to prevent the decrease in damping performance of the preview damping control for the sprung portion.

In the above description, for easier understanding of the present disclosure, the terms and/or reference symbols used in at least one embodiment described below are enclosed in parentheses and assigned to the components of the present disclosure corresponding to the at least one embodiment. However, the constituent elements of the present disclosure are not limited to the at least one embodiment defined by the terms and/or reference symbols. Other objects, other features, and accompanying advantages of the present disclosure are easily understandable from the description of the at least one embodiment of the present disclosure to be given with reference to the following drawings.

BRIEF DESCRIPTION OF THE DRAWINGS

FIG. 9 is an explanatory table of unsprung displacement information in a first modification example of the at least one embodiment of the present disclosure.

DESCRIPTION OF THE EMBODIMENTS

<Configuration>

Figure 1:
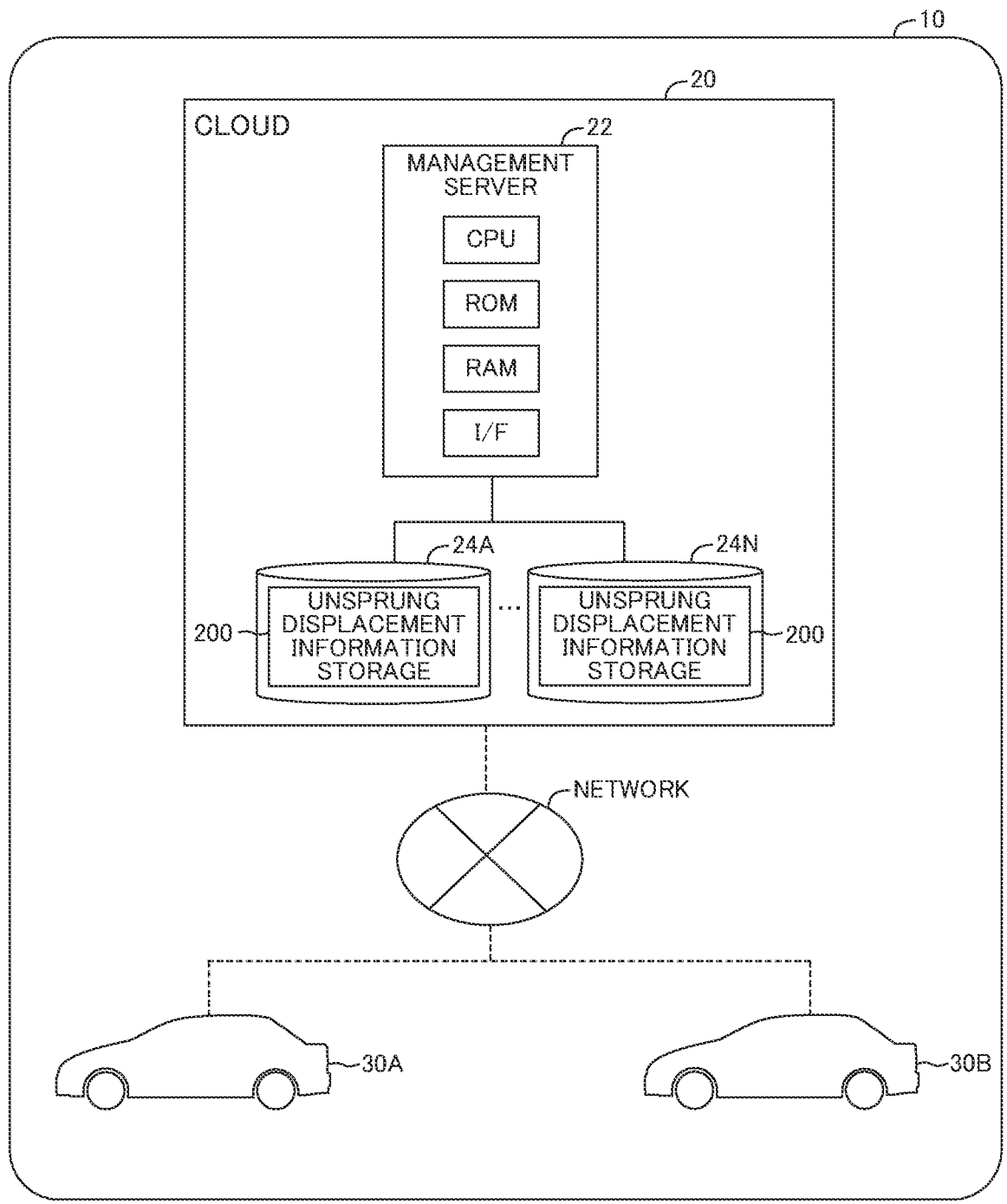
FIG. 1 is a network configuration diagram of a damping control system for a vehicle according to at least one embodiment of the present disclosure.

As illustrated in FIG. 1, a damping control system 10 for a vehicle according to at least one embodiment of the present disclosure includes a cloud system 20 and a plurality of vehicles 30A and 30B. For the convenience of description, only the two vehicles 30A and 30B are illustrated in FIG. 1, but the damping control system 10 may further include a larger number of vehicles. When it is not required to distinguish the plurality of vehicles (30A and 30B) from each other, each of the plurality of vehicles such as the vehicles 30A and 30B is referred to as "vehicle 30." The vehicle 30 is connected to the cloud system 20 through a network in a manner that allows data communication. The damping control system 10 is only required to include at least one vehicle 30.

<Cloud System 20>

The cloud system 20 includes a management server 22 and storage media 24A to 24N. When it is not required to distinguish the storage media 24A to 24N from one another; each of the storage media 24A to 24N is referred to as "storage medium 24." The cloud system 20 is only required to include at least one storage medium 24. The storage medium 24 may be installed in the management server 22. The management server 22 is sometimes simply referred to as "server 22." The management server 22 and the storage media 24 are sometimes collectively referred to as "storage device."

The management server 22 includes a CPU, a ROM, a RAM, an interface (I/F), and the like. The management server 22 is connected to the storage media 24 in a manner that allows data communication. The management server 22 can search for and read out data stored in the storage media 24, and can write (store) data to the storage media 24.

Figures 2A, 2B:
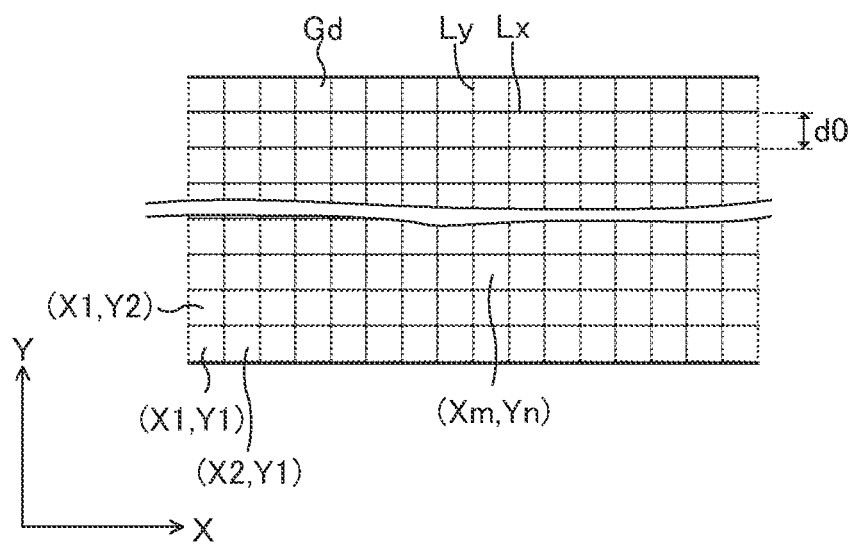
FIG. 2A is an explanatory table of unsprung displacement information stored in a storage device of FIG. 1.
FIG. 2B is an explanatory diagram of blocks of the unsprung displacement information.

Each of the storage media 24 includes an unsprung displacement information storage 200 for storing unsprung displacement information of FIG. 2A. The unsprung displacement information is sometimes referred to as "related value information." In the unsprung displacement information, an unsprung displacement $z1$ described below is stored in each of a plurality of blocks Gd of FIG. 2B. The blocks Gd are regions surrounded by a plurality of parallel lines Lx in an X direction and a plurality of parallel lines Ly in a Y direction. In this example, the blocks Gd are squares having sizes equal to one another. A distance d0 of one side of the block Gd has a value equal to or larger than 50 mm and equal to or smaller than 150 mm. In this example, the distance d0 is 100 mm. The shape of the block Gd is not limited to the square, and may be defined in accordance with the size and the shape of a ground contact region of a tire of the wheel 31 of the vehicle 30.

The X direction is the north direction in azimuth in this example. The Y direction is a direction perpendicular to the X direction. The position of the block Gd in the X direction and the Y direction are represented by a value Xm (m=1, 2, 3, ...) and a value Yn (n=1, 2, 3, ...). In other words, one of the plurality of blocks Gd is identified by a data set (Xm, Yn) of the value Xm and the value Yn. A range of each of the plurality of blocks Gd is defined by the latitude and the longitude. Thus, when position information identified by a combination of certain longitude and latitude is given, a specific block Gd (Xm, Yn) of the plurality of blocks Gd is determined.

<Vehicle 30>

Figure 3:
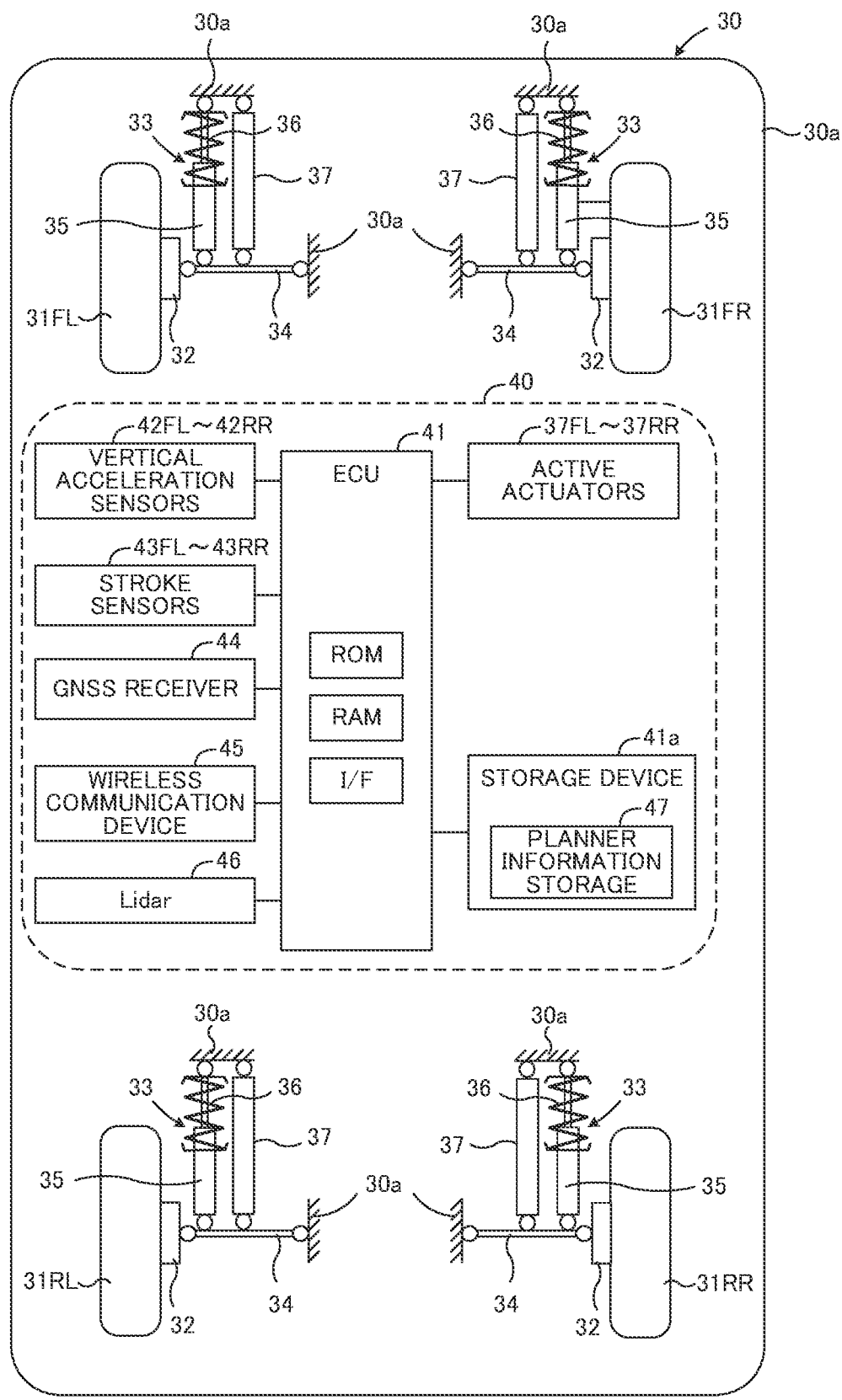
FIG. 3 is a schematic configuration diagram of the vehicle of FIG. 1.

With reference to FIG. 3, description is now given of the vehicle 30.

The vehicle 30 obtains "a sprung acceleration ddz2, a stroke H, the position information (X, Y), and position reliability Da indicating reliability of the position information (X, Y)" described below for each of the wheels 31FL to 31RR. The position information (X, Y) includes a latitude and a longitude indicating a current position of the vehicle 30. The reliability of the position information (X, Y) is precision and probability of the position information (X, Y). The vehicle 30 associates those pieces of data (that is, the sprung acceleration ddz2, the stroke H, the position information (X, Y), and the position reliability Da indicating the reliability of the position information (X, Y)) with one another, and stores, as "travel information," the associated data in a memory (for example, RAM) of the vehicle 30. The vehicle 30 transmits the travel information to the management server 22 each time a predetermined period elapses. When the management server 22 receives the travel information, the management server 22 uses the received travel information to update the unsprung displacement information.

The vehicle 30 includes a suspension system for each of the wheels 31FL to 31RR. A configuration of the suspension system is common among the wheels 31FL to 31RR. A reference symbol common among the wheels 31FL to 31RR is assigned to each of components of the suspension system. Further, in the following, components having "FL", "FR", "RL", and "RR" as ends of the reference symbols indicate components corresponding to the left front wheel, the right front wheel, the left rear wheel, and the right rear wheel, respectively. Moreover, when it is not required to distinguish the wheels 31FL to 31RR from one another, each of the wheels 31FL to 31RR is referred to as "wheel 31."

The wheel 31 is rotatably supported by a vehicle body 30a (hereinafter sometimes referred to as "vehicle body part 30a") by a wheel support member 32, and is suspended from the vehicle body 30a by a suspension 33 of an independent suspension type. The suspension 33 includes a suspension arm 34, a shock absorber 35, a suspension spring 36, and an active actuator 37. The suspension arm 34 couples the wheel support member 32 to the vehicle body 30a. In FIG. 3, only one suspension arm 34 of the wheel 31 is illustrated for the wheel 31, but a plurality of suspension arms 34 may be provided to the wheel 31. The suspension 33 may be a suspension of a type other than the independent suspension type.

The shock absorber 35 is coupled, at an upper end thereof, to the vehicle body 30a, and is coupled, at a lower end thereof, to the suspension arm 34. The suspension spring 36 is coupled, at an upper end thereof, to the vehicle body 30a, and is coupled, at a lower end thereof, to a cylinder of the shock absorber 35.

A member on the wheel 31 side with respect to the suspension spring 36 is referred to as "unsprung member 50 (see FIG. 4) or unsprung portion 50." Meanwhile, a member on the vehicle body 30a side with respect to the suspension spring 36 is referred to as "sprung member 51 (see FIG. 4) or sprung portion 51."

The active actuator 37 is provided in parallel to the shock absorber 35 and the suspension spring 36 between the vehicle body 30a and the suspension arm 34. The active actuator 37 is an active suspension device of an electromagnetic type, and generates a control force Fc based on a control command from an electronic control device (hereinafter referred to as "ECU") 41 described below. The control force Fc is a force in the vertical direction acting between the vehicle body 30a and the wheel 31 (that is, the sprung portion 51 of FIG. 4 and the unsprung portion 50 of FIG. 4) in order to damp the sprung portion 51. The active actuator 37 is sometimes referred to as "control force generation device 37." The active actuator 37, the shock absorber 35, the suspension spring 36, and the like form the active suspension.

Further, the damping control device 40 is mounted to the vehicle 30, The damping control device 40 includes the ECU 41. The ECU 41 includes a microcomputer. The microcomputer includes a CPU, a ROM, a RAM, an interface (I/F), and the like. The CPU executes instructions (programs and routines) stored in the ROM, to thereby achieve various functions. The ECU 41 is sometimes referred to as "control unit 41 or controller 41."

The ECU 41 is connected to a nonvolatile storage device 41a to and from which information can be written and read. In this example, the storage device 41a is a hard disk drive. The ECU 41 can store (preserve) the information in the storage device 41a, and can read out the stored (preserved) information in the storage device 41a. The storage device 41a is not limited to the hard disk drive, and is only required to be a well-known storage device or storage medium to and from which information can be written and read. The storage device 41a includes a map storage (not shown) and a planner information storage 47. The map storage stores a navigation map including position information indicating positions of 3D objects such as buildings and signals. The planner information storage 47 stores planner information. The planner information is used in a third modification example of the present disclosure described below.

The ECU 41 is connected to vertical acceleration sensors 42FL to 42RR and stroke sensors 43FL to 43RR, and receive detection signals from those sensors. When it is not required to distinguish the vertical acceleration sensors 42FL to 42RR from one another, each of the vertical acceleration sensors 42FL to 42RR is referred to as "vertical acceleration sensor 42." Similarly, each of the stroke sensors 43FL to 43RR is referred to as "stroke sensor 43."

The vertical acceleration sensor 42 measures the sprung acceleration ddz2 being an acceleration of the vehicle body 30a (sprung portion 51 of FIG. 4) in the vertical direction at a position of the corresponding wheel 31. The vertical acceleration sensor 42 transmits the detection signal indicating the sprung acceleration ddz2 to the ECU 41.

The stroke sensor 43 measures the stroke H in the vertical direction of the corresponding suspension 33. The stroke sensor 43 transmits the detection signal indicating the stroke H to the ECU 41.

The sprung acceleration ddz2 and the stroke H are values that change in accordance with a road surface displacement being a displacement of the road surface in the vertical direction, and are sometimes referred to as "change values."

Further, the ECU 41 is connected to a global navigation satellite system (GNSS) receiver 44, a wireless communication device 45, and a laser imaging detection and ranging (Lidar) 46. The GNSS receiver 44 is a device for receiving positioning signals transmitted from positioning satellites. The ECU 41 uses the longitude and the latitude to identify the current position of the vehicle 30 based on the positioning signals received by the GNSS receiver 44. Further, the ECU 41 obtains the position information (X, Y) indicating the current position of the wheel 31 based on the identified current position of the vehicle 30 and "a positional relationship between the wheel 31 (each of the wheels 31FL to 31RR) and the GNSS receiver 44 in the vehicle 30." The value "X" indicates the latitude, and the value "Y" indicates the longitude. Further, the ECU 41 obtains the position reliability Da of the position information (X, Y). The position reliability Da is defined such that the position reliability Da has a larger value as there increases reliability (precision or probability) of the current position of the vehicle 30 identified based on the positioning signals. Description is given below of details of processing for obtaining the position reliability Da.

The wireless communication device 45 is a device for connecting the ECU 41 to the network.

The Lidar 46 is a well-known periphery sensor for emitting a light ray and receiving a reflected light ray of the emitted light ray, to thereby detect positions of 3D objects existing around the vehicle 30 with respect to the vehicle 30.

Further, the ECU 41 is connected to each of the active actuators 37FL to 37RR via a drive circuit (not shown).

The ECU 41 calculates a target control force Fct for damping the sprung portion 51 based on the unsprung displacement z1 at a predicted passing position described later of the wheel 31 (each of the wheels 31FL to 31RR). The ECU 41 controls the active actuator 37 so that the active actuator 37 generates a control force Fc corresponding to (matching) the target control force Fct when the wheel 31 (each of the wheels 31FL to 31RR) actually passes (reaches) the predicted passing position. This control of the active actuator 37 is referred to as "preview damping control."

<Overview of Preview Damping Control>

Figure 4:
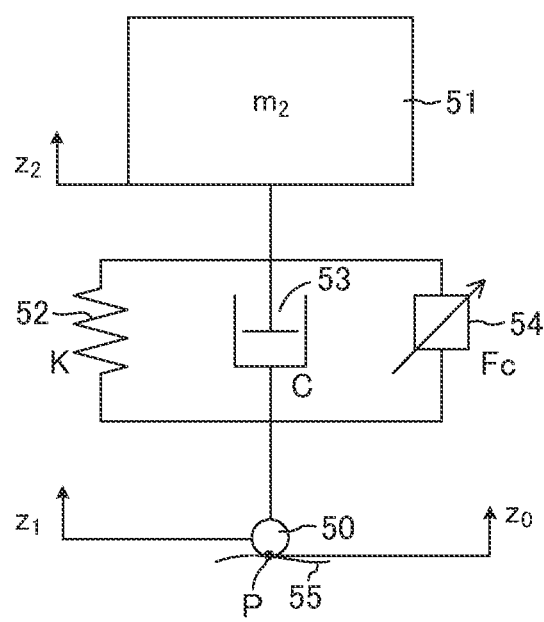
FIG. 4 is a diagram for illustrating a single-wheel model of the vehicle of FIG. 1.

FIG. 4 is diagram for illustrating a single-wheel model of the vehicle 30 on a road surface 55. A spring 52 of FIG. 4 corresponds to the suspension spring 36 of FIG. 3. A dumper 53 of FIG. 4 corresponds to the shock absorber 35 of FIG. 3. An actuator 54 of FIG. 4 corresponds to the active actuator 37 of FIG. 3.

In FIG. 4, the mass of the sprung portion 51 is represented by a sprung mass m2. A displacement of the unsprung portion 50 in the vertical direction at a position P of the road surface 55 is represented by the unsprung displacement z1. Further, a displacement of the sprung portion 51 in the vertical direction at the position P is represented by the sprung displacement z2. The sprung displacement z2 is a displacement of the sprung portion 51 in the vertical direction corresponding to the position of the wheel 31. The spring constant (equivalent spring constant) of the spring 52 is represented by a spring constant K. A damping coefficient (equivalent damping coefficient) of the damper 53 is represented by a damping coefficient C. A force generated by the actuator 54 is represented by the control force Fc.

Time derivatives of z1 and z2 are represented by dz1 and dz2, respectively. Second-order time derivatives of z1 and z2 are represented by ddz1 and ddz2, respectively. It is assumed in the following that an upward displacement of each of z1 and z2 is positive, and an upward force generated by each of the spring 52, the damper 53, the actuator 54, and the like is positive.

A motion equation for a motion of the sprung portion 51 of FIG. 4 in the vertical direction can be given by Expression (1).

$$m2ddz2=C(dz1-dz2)+K(z1-z2)-Fc \qquad (1)$$

It is assumed that the damping coefficient C of Expression (1) is constant. However; an actual damping coefficient changes in accordance with the stroke speed of the suspension 33. Thus, the damping coefficient C may be set to, for example, a value that changes in accordance with a time derivative of the stroke H.

Further, when vibration of the sprung portion 51 is completely canceled by the control force Fc (that is, when each of the sprung acceleration ddz2, the sprung speed dz2, and the sprung displacement z2 becomes zero), the control force Fc is given by Expression (2).

$$Fc=Cdz1+Kz1 \qquad (2)$$

When the active actuator 37 generates the control force Fc matching "the target control force Fct calculated in accordance with a mathematical expression given by Expression (3)" at a time (passing timing) when the wheel 31 passes the position P, the vibration of the sprung portion 51 can be reduced compared with a case in which the active actuator 37 does not generate the control force Fc. A gain β1 of Expression (3) is a value (=km·C) obtained by multiplying the damping coefficient C by "any constant (km) larger than 0 and equal to or smaller than 1." A gain β2 of Expression (3) is a value (=km·K) obtained by multiplying the spring constant K by the constant (km).

$$Fct=\beta1\times dz1+\beta2\times z1 \qquad (3)$$

The target control force Fct may be calculated based on Expression (4) obtained by omitting a differential term (β1×dz1) from Expression (3). Also in this case, the actuator 54 generates the control force Fc (=β2×z1) for reducing the vibration of the sprung portion 51, and the vibration of the sprung portion 51 can thus be reduced compared with the case in which the control force Fc is not generated. Thus, the ECU 41 calculates the target control force Fct based on Expression (4). The gain β2 is hereinafter simply referred to as "gain β."

$$Fct=\beta2\times z1 \qquad (4)$$

Description is now given of the predicted passing position of the wheel 31.

A position apart from the current ground contact position of the wheel 31 by a pre-read distance Lp along a predicted movement course of the wheel 31 is the predicted passing position.

The predicted movement course is identified based on "a traveling direction Td of the vehicle 30 identified based on a history of the current position of the vehicle 30."

The pre-read distance Lp is obtained by multiplying a pre-read period Tp and a vehicle speed V1 by each other.

The pre-read period Tp is set in advance to a period required for the active actuator 37 to generate the control force Fc matching the target control force Fct after the ECU 41 identifies the predicted passing position.

The vehicle speed V1 is obtained by dividing a distance along the predicted movement course of the vehicle 30 from the current position of the vehicle 30 identified for the previous time to the current position of the vehicle 30 identified for this time by "a period from a time at which the current position of the vehicle 30 is identified for the previous time to a time at which the current position of the vehicle 30 is identified for this time."

The ECU 41 obtains the unsprung displacement z1 at "the predicted passing position obtained as described above" as described below, and transmits, to the active actuator 37, the control command including the target control force Fct calculated based on the unsprung displacement z1. As a result, the active actuator 37 can generate the control force Fc matching the target control force Fct at the timing at which the wheel 31 passes the predicted passing position.

(Overview of Operation of Damping Control System 10)

The ECU 41 obtains data listed below while the vehicle 30 is traveling.

Sprung acceleration ddz2 of the wheel 31

Stroke H corresponding to the wheel 31

Position information (X, Y) indicating the position (measurement position) of the wheel 31 at the time when the sprung acceleration ddz2 and the stroke H are obtained Position reliability Da of the position information (X, Y)

The ECU 41 stores, as the travel information, one set of data (ddz2, H, (X, Y), Da) formed by associating those pieces of data with one another in the storage device 41a or the RAM. The ECU 41 transmits the stored travel information to the management server 22 each time a predetermined period elapses. The travel information transmitted by the ECU 41 to the management server 22 includes at least one or more sets of the data (data sets).

When the management server 22 receives the travel information, the management server 22 updates the unsprung displacement information based on the received travel information. More specifically, the management server 22 first obtains the unsprung displacement z1 based on the sprung acceleration ddz2 and the stroke H of the travel information. In more detail, the management server 22 obtains the sprung displacement z2 through second-order integration of the sprung acceleration ddz2, and subtracts the stroke H from the sprung displacement z2, to thereby obtain the unsprung displacement z1. After that, the management server 22 updates the unsprung displacement z1 of "a data set of the unsprung displacement information" matching (corresponding to) the position information (X, Y) included in the received travel information based on "the unsprung displacement z1 obtained based on the received travel information." It should be noted, however, that the management server 22 updates the unsprung displacement z1 based on the received travel information only when the position reliability Da included in the received travel information is equal to or higher than a threshold reliability Dath. In other words, the management server 22 does not update the unsprung displacement z1 based on the received travel information when the position reliability Da included in the received travel information is lower than the threshold reliability Dath.

When the position reliability Da of the travel information is lower than the threshold reliability Dath, the position of the wheel 31 indicated by the position information (X, Y) of the travel information is highly likely to separate from the original position of the wheel 31. When the unsprung displacement information is updated based on the above-mentioned travel information, there is updated "the unsprung displacement z1 of the unsprung displacement information" corresponding to a position different from the original position at which the unsprung displacement z1 is actually measured. Thus, the unsprung displacement z1 of an unsprung displacement map Mapz1 (X, Y) after the update is highly likely to be an inaccurate value.

To deal with this problem, as described above, this system is configured to avoid updating the unsprung displacement z1 of the unsprung displacement information based on the travel information having the position reliability Da lower than the threshold reliability Dath. As a result, it is possible to prevent the unsprung displacement z1 of the unsprung displacement information from being an inaccurate value. That is, "a highly precise unsprung displacement z1" is stored in the unsprung displacement information of this system, and there thus can be increased a possibility that the sprung portion 51 is appropriately damped through the preview damping control.

(Specific Operation)

<Travel Information Collection Routine>

The CPU of the ECU 41 (hereinafter "first CPU" refers to the CPU of the ECU 41 unless otherwise specified) of the vehicle 31 executes a travel information collection routine illustrated as a flowchart of FIG. 5 each time a predetermined period elapses. This routine is executed for each of the wheels 31FL to 31RR.

Figure 5:
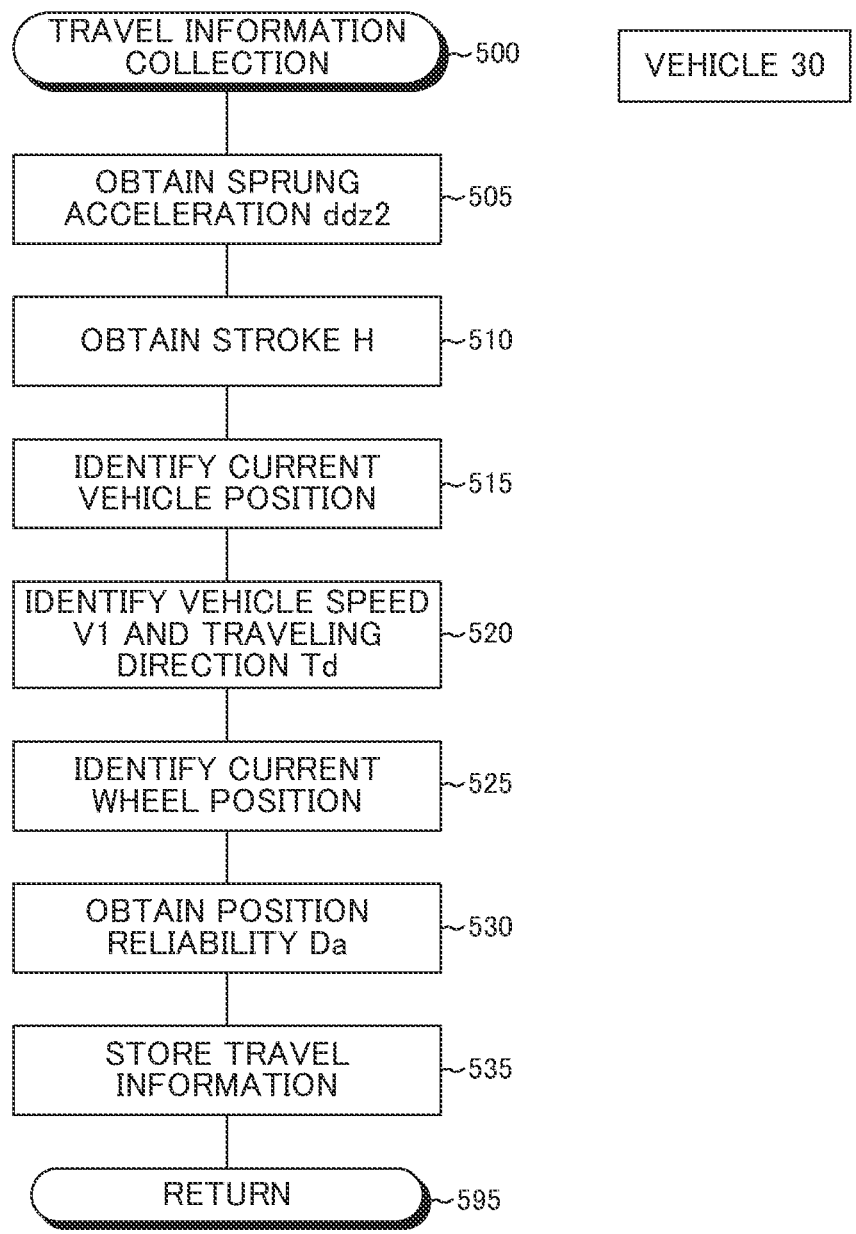
FIG. 5 is a flowchart for illustrating a travel information collection routine executed by the vehicle of FIG. 1.

Thus, the first CPU starts processing from Step 500 of FIG. 5 at a predetermined timing, and executes Step 505 to Step 535 in the stated order. Then, the process proceeds to Step 595, and the first CPU temporarily finishes this routine.

Step 505: The first CPU obtains the sprung acceleration ddz2 from the vertical acceleration sensor 42.

Step 510: The first CPU obtains the stroke H from the stroke sensor 43. The stroke H is a stroke of the suspension 33 in the vertical direction, and corresponds to a value obtained by subtracting the unsprung displacement z1 from the sprung displacement z2.

Step 515: The first CPU identifies the current position of the vehicle 30 (that is, the current position of the GNSS receiver 44) based on the positioning signals received by the GNSS receiver 44.

Step 520: The CPU identifies the vehicle speed V1 and the traveling direction Td based on the current position for the previous time and the current position for this time of the vehicle 30.

Step 525: The CPU identifies the current position of the wheel 31 based on the current position and the traveling direction Td of the vehicle 30, and the above-mentioned positional relationship data.

Step 530: The CPU obtains the position reliability Da based on Expression (5).

$$Da = \alpha 1 \times Dfix + \alpha 2 \times Ddop + \alpha 3 \times Dv1 + \alpha 4 \times Dma \quad (5)$$

Each of $\alpha 1$ to $\alpha 4$ of Expression (5) is set to a predetermined value equal to or larger than "0" and equal to or smaller than "1". Each of Dfix, Ddop, Dv1, and Dma is a value equal to or larger than "0" and equal to or smaller than "1", and indicates that the position reliability becomes higher as the value becomes larger.

The value Dfix of Expression (5) is obtained in accordance with whether a measurement result of the current position based on the positioning signals received by the GNSS receiver 44 is a Fix solution or a Float solution. The precision of the current position at the time when the measurement result is the Fix solution is higher than the precision of the current position at the time when the measurement result is the Float solution. The first CPU sets the value of Dfix to "1" when the measurement result is the Fix solution, and sets the value of Dfix to "0" when the measurement result is the Float solution. The Fix solution and the Float solution are described in, for example, Japanese Patent Application Laid-open No. 2020-38498, Japanese Patent Application Laid-open No. 2020-56740, and Japanese Patent Application Laid-open No. 2019-82400.

The value Ddop of Expression (5) is obtained in accordance with a dilution-of-precision (DOP) value calculated based on positions of the positioning satellites that have transmitted the positioning signals received by the GNSS receiver 44, The DOP value is a value equal to or larger than 0 and equal to or smaller than 1, and indicates that the precision of the position becomes higher as the value becomes smaller. The value Ddop indicates that the precision of the position becomes higher as the value of Ddop becomes larger, and is thus obtained by subtracting the DOP value from "1". The DOP value is described in Japanese Patent Application Laid-open No. 2014-219204.

The value Dv1 of Expression (5) is obtained in accordance with whether the vehicle speed V1 is equal to or higher than a threshold value V1th . The first CPU obtains the value of Dv1 so that the value of Dv1 at the time when the vehicle speed V1 is equal to or higher than the threshold value V1th is larger than the value of Dv1 at the time when the vehicle speed V1 is lower than the threshold value V1th . In general, when the vehicle speed V1 is low, it is difficult to identify the traveling direction Td of the vehicle 30 compared with the time when the vehicle speed V1 is high. Thus, the precision of the current position at the time when the vehicle speed V1 is low is lower than the precision of the current position at the time when the vehicle speed V1 is high. As an example, the first CPU sets the value of Dv1 to "1" when the vehicle speed V1 is equal to or higher than the threshold value V1th, and sets the value of Dv1 to "0" when the vehicle speed V1 is lower than the threshold value V1th.

The value Dma of Expression (5) is obtained in accordance with a result of matching between a position of each 3D object detected by the Lidar 46 with respect to the vehicle 30 and a position of each 3D object registered in the navigation map.

As an example, the first CPU obtains the value of Dma through calculation as described below.

The first CPU uses the navigation map to identify, as first 3D objects, 3D objects existing within a predetermined distance range from the current position of the vehicle 30 for this time, and obtains the number NN of the first 3D objects.

The first CPU obtains the number NL of 3D objects that can be detected by the Lidar 46 among the first 3D objects.

The first CPU obtains a quotient of the number NL divided by the number NN as the value of Dma (=NL/NN).

The position reliability Da may be obtained based on at least one of Dfix, Ddop, Dv1, or Dma.

Step 535: The first CPU associates the sprung acceleration ddz2, the stroke H, the position information (X, Y) indicating the current position of the wheel 31, and the position reliability Da with one another, and stores, as the travel information, the associated data in the storage device 41a.

<Travel Information Transmission Routine>

Figure 6:
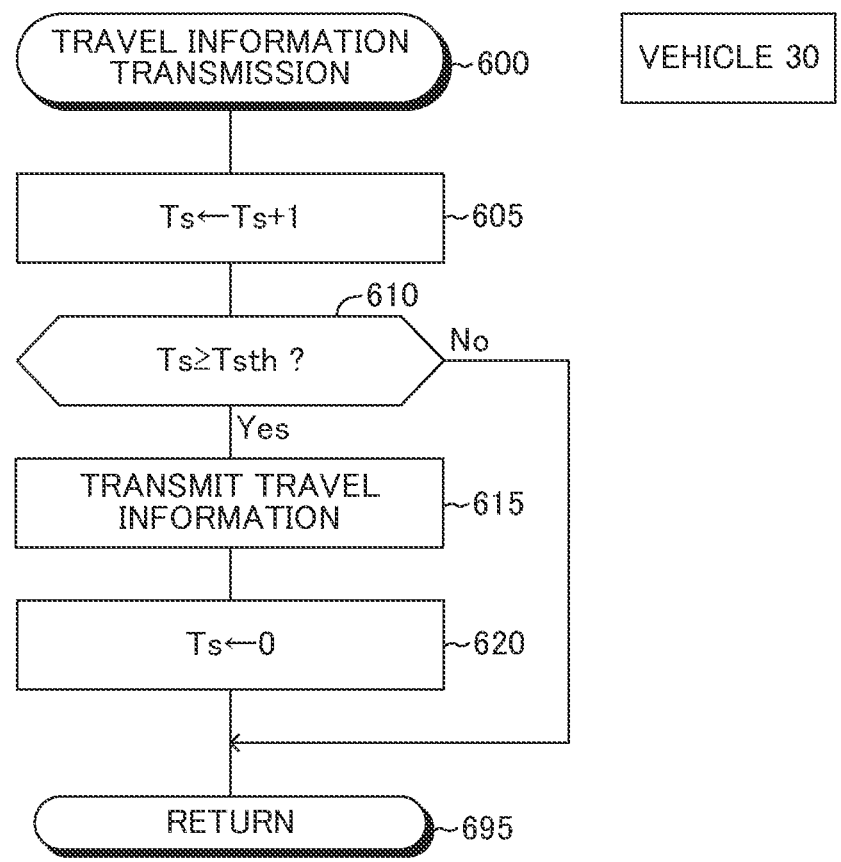
FIG. 6 is a flowchart for illustrating a travel information transmission routine executed by the vehicle of FIG. 1.

The first CPU executes a travel information transmission routine illustrated as a flowchart of FIG. 6 each time a predetermined period elapses.

Step 605: The first CPU adds "1" to a value of a transmission timer Ts.

The transmission timer Ts is a timer for counting a period that has elapsed since a time at which the travel information was transmitted to the management server 22 for the previous time (hereinafter referred to as "previous transmission time").

Step 610: The first CPU determines whether or not the value of the transmission timer Ts is equal to or larger than a threshold value Tsth (positive constant).

When the value of the transmission timer Ts is smaller than the threshold value Tsth, the first CPU makes a determination of "No" in Step 610. Then, the process proceeds to Step 695, and the first CPU temporarily finishes this routine.

Meanwhile, when the value of the transmission timer Ts is equal to or larger than the threshold value Tsth, the first CPU makes a determination of "Yes" in Step 610, and executes Step 615 and Step 620 in the stated order. After that, the process proceeds to Step 695, and the first CPU temporarily finishes this routine.

Step 615: The first CPU transmits, to the management server 22, the travel information that has not been transmitted.

Step 620: The CPU sets the value of the transmission timer Ts to "0".

<Unsprung Displacement Information Update Routine>

The CPU of the management server 22 (hereinafter "second CPU" refers to the CPU of the management server 22 unless otherwise specified) executes an unsprung displacement information update routine illustrated as a flowchart of FIG. 7 each time a predetermined period elapses.

Figure 7:
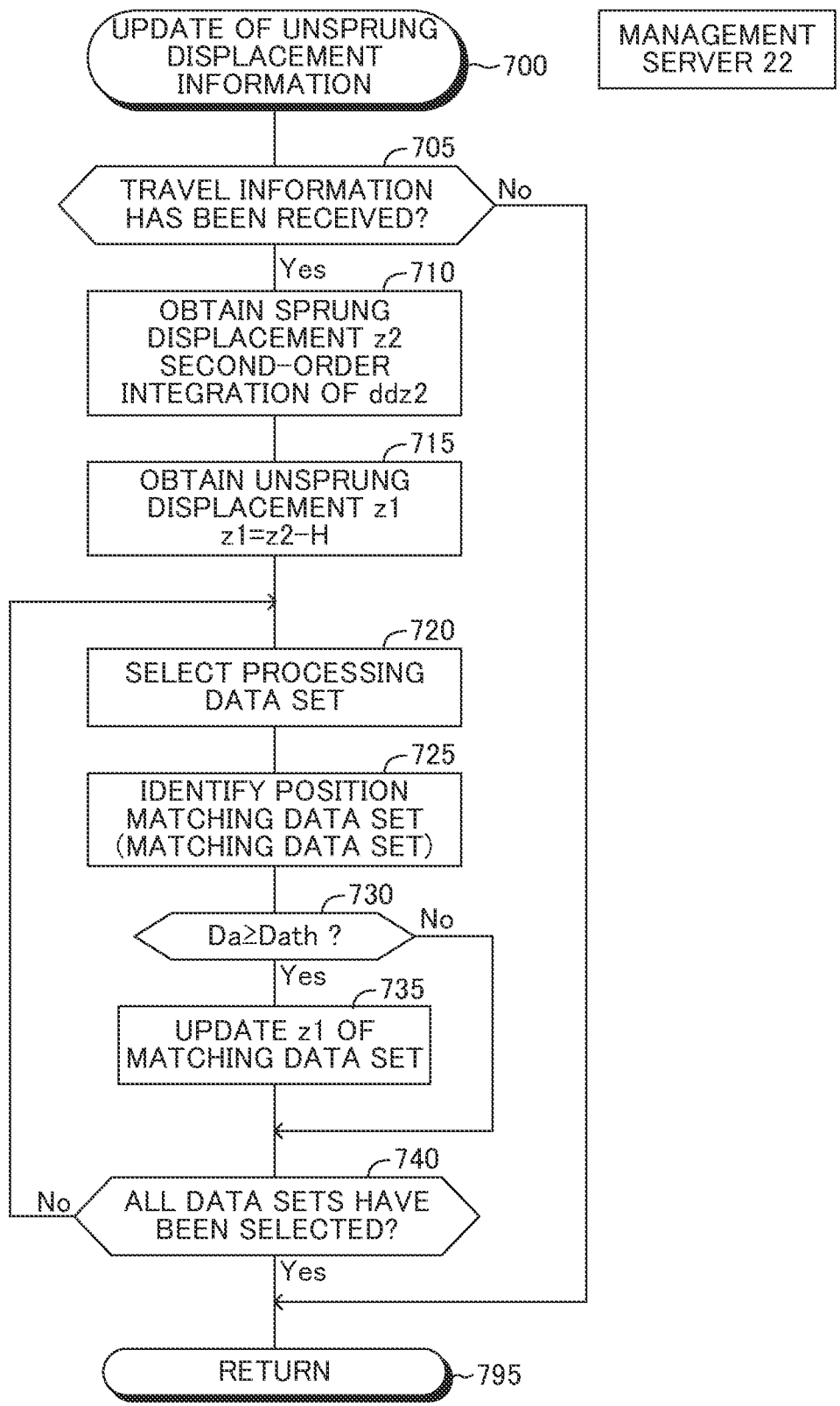
FIG. 7 is a flowchart for illustrating an unsprung displacement information update routine executed by a server of FIG. 1.

Thus, the second CPU starts processing from Step 700 of FIG. 7 at a predetermined timing. Then, the process proceeds to Step 705, and the second CPU determines whether or not the travel information has been received from the vehicle 30 in a period from a time at which this routine was executed previously to a time at which this routine is executed for this time. When the travel information has not been received in that period, the second CPU makes a determination of "No" in Step 705. Then, the process proceeds to Step 795, and the second CPU temporarily finishes this routine.

When the travel information has been received in the above-mentioned period, the second CPU makes a determination of "Yes" in Step 705, and executes Step 710 to Step 730 in the stated order.

Step 710: The second CPU obtains the sprung displacement z2 through the second-order integration of the sprung acceleration ddz2 included in the travel information.

Step 715: The second CPU subtracts the stroke H associated with the sprung displacement z2 from the sprung displacement z2, to thereby obtain the unsprung displacement z1. The second CPU deletes the sprung acceleration ddz2 and the stroke H from each data set of the travel information, and instead, registers the unsprung displacement z1 obtained in Step 715. As a result, in each data set (hereinafter sometimes referred to as "original data set") of the travel information held by the management server 22, the unsprung displacement z1, the position information (X, Y), and the position reliability Da are associated with one another. The second CPU may obtain, without deleting the sprung acceleration ddz2 and the stroke H2, as the original data set, a data set formed by associating the unsprung displacement z1, the position information (X, Y), and the position reliability Da with one another.

Step 720: The second CPU selects, as a processing data set, one data set to be used for processing steps of Step 725 to 735 described below from the original data sets.

Step 725: The second CPU identifies, as a matching data set, a data set that includes, in the block Gd, the position indicated by the position information (X, Y) of the processing data set among the data sets on the unsprung displacement information.

Step 730: The second CPU determines whether or not the position reliability Da of the processing data set is equal to or higher than the threshold reliability Dath.

When the position reliability Da is equal to or higher than the threshold reliability Dath, the second CPU makes a determination of "Yes" in Step 730, and executes Step 735 and Step 740 in the stated order.

Step 735: The second CPU updates the unsprung displacement z1 of the matching data set based on the unsprung displacement z1 of the processing data set.

Description is now given of an example of the update of the unsprung displacement z1 of the matching data set.

The second CPU calculates an average value or a weighted average value of the unsprung displacement z1 of the matching data set and the unsprung displacement z1 of the processing data set as a new unsprung displacement z1, and overwrites the unsprung displacement z1 of the matching data set with this new unsprung displacement z1. The second CPU may overwrite the unsprung displacement z1 of the matching data set with the unsprung displacement z1 of the processing data set.

Step 740: The second CPU determines whether or not there have been selected, as the processing data set, all of the original data sets generated based on the travel information received in a period from the time at which this routine was executed for the previous time to the time at which this routine is executed for the current time.

When all of the original data sets have not been selected as the processing data set, the second CPU makes a determination of "No" in Step 740, and the process returns to Step 720. Then, the second CPU selects a new processing data set from the original data sets, and the process proceeds to Step 725.

When the position reliability Da of the processing data set is lower than the threshold reliability Dath in the case in which the process proceeds to Step 730, the second CPU makes a determination of "No" in Step 730, and does not update the matching data set. Then, the process proceeds to Step 740.

When all of the original data sets have been selected as the processing data set in the case in which the process proceeds to Step 740, the second CPU makes a determination of "Yes" in Step 740. Then, the process proceeds to Step 795, and the second CPU temporarily finishes this routine.

As appreciated from the description given above, when the position reliability Da of the processing data set is low, the second CPU does not update the unsprung displacement z1 of the matching data set. As a result, the unsprung displacement z1 of the matching data set is not updated through use of the unsprung displacement z1 of the processing data set having low position reliability Da. Thus, the unsprung displacement z1 of the matching data set does not become inaccurate, and it is thus possible to prevent the unsprung displacement z1 included in the data set of the unsprung displacement information from becoming an inaccurate value.

<Preview Damping Control Routine>

Figure 8:
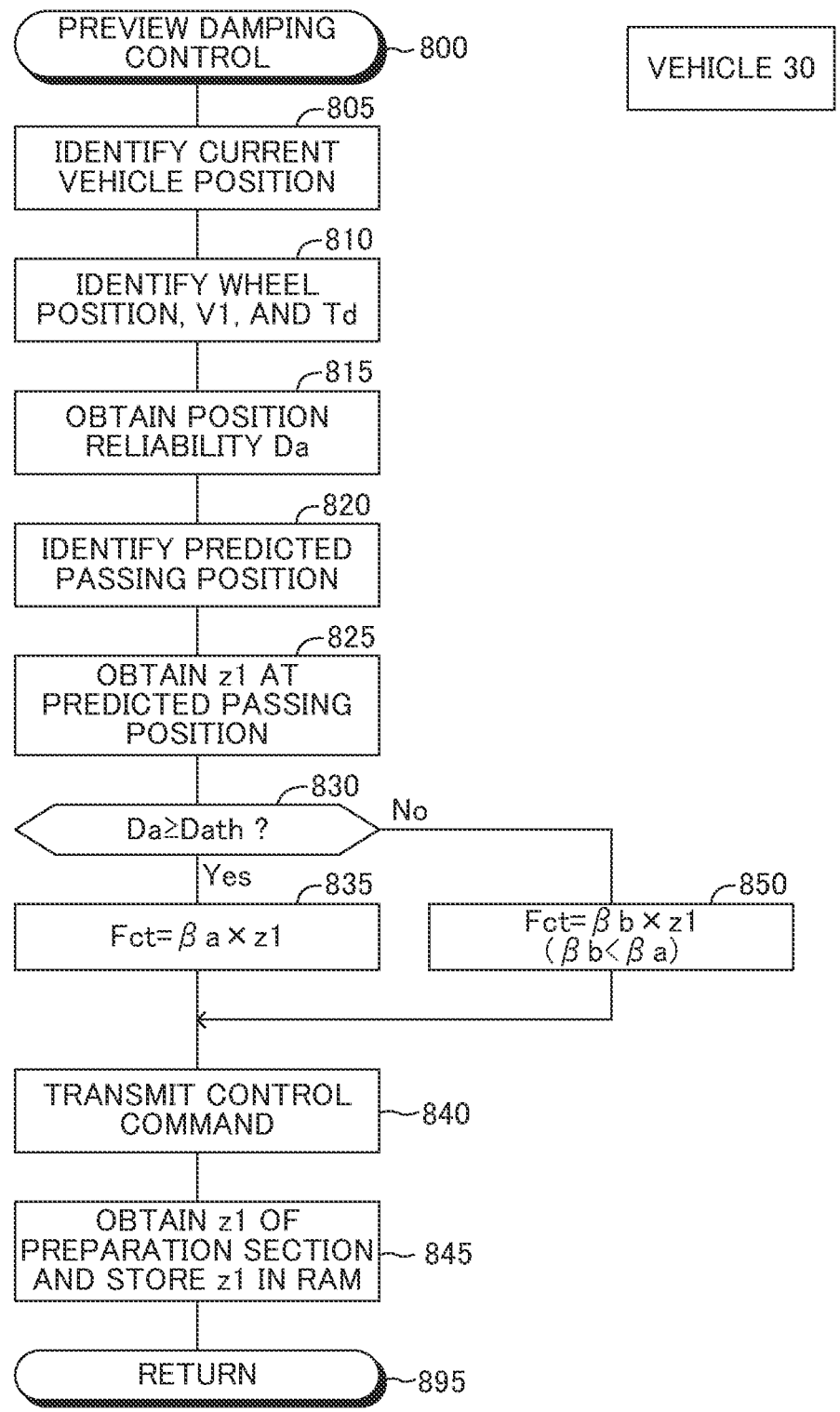
FIG. 8 is a flowchart for illustrating a preview damping control routine executed by the vehicle of FIG. 1.

The first CPU executes a preview damping control routine illustrated as a flowchart of FIG. 8 each time a predetermined period elapses. This routine is executed for each of the wheels 31FL to 31RR.

Thus, the first CPU starts processing from Step 800 of FIG. 8 at a predetermined timing, and executes Step 805 to Step 830 in the stated order.

Step 805: The first CPU identifies the current position of the vehicle 30 based on the positioning signals received by the GNSS receiver 44.

Step 810: The first CPU identifies the vehicle speed V1 and the traveling direction Td in the same manner as in Step 520 of FIG. 5, and identifies the current position of the wheel 31 in the same manner as in Step 525 of FIG. 5.

Step 815: The first CPU obtains the position reliability Da in the same manner as in Step 530 of FIG. 5.

Step 820: The first CPU identifies the predicted passing position of the wheel 31 based on the current position of the wheel 31, the vehicle speed V1, and the traveling direction Td.

Step 825: The first CPU obtains the unsprung displacement z1 at the predicted passing position from "unsprung displacements z1 in a preparation section" described below, which are obtained in advance from the unsprung displacement information of the cloud system 20. The unsprung displacement z1 of the predicted passing position is sometimes referred to as "control related value."

Step 830: The first CPU determines whether or not the position reliability Da obtained in Step 815 is equal to or higher than the threshold reliability Dath.

When the position reliability Da is equal to or higher than the threshold reliability Dath, the first CPU makes a determination of "Yes" in Step 830, and executes Step 835 to Step 845 in the stated order. After that, the process proceeds to Step 895, and the first CPU temporarily finishes this routine.

Step 835: The first CPU calculates the target control force Fct through use of Expression (6).

$$Fct=\beta a \times z1 \qquad (6)$$

The value "βa" of Expression (6) is a predetermined gain, and is referred to as "first gain βa." The value z1 of Expression (6) is the unsprung displacement z1 at the predicted passing position.

Step 840: The first CPU transmits the control command including the target control force Fct to the active actuator 37.

Step 845: When the predicted passing position reaches a position ahead of an end point of the preparation section by a predetermined distance, the first CPU obtains "the unsprung displacements z1 and the position information (X, Y)" of "the preparation section having the predicted passing position as a start point" from the unsprung displacement information of the cloud system 20, and stores the obtained unsprung displacement z1 and position information (X, Y) in the RAM.

The preparation section is a section having the predicted passing position as the start point and the position apart from the start point by a predetermined preparation distance along the predicted movement course of the wheel 31 as the end point. The preparation distance is set in advance to a value sufficiently longer than the pre-read distance.

Meanwhile, when the position reliability Da is equal to or higher than the threshold reliability Dath in the case in which the process proceeds to Step 830, the first CPU makes a determination of "No" in Step 830, and executes Step 850. Then, the processing proceeds to Step 845.

Step 850: The first CPU calculates the target control force Fct through use of Expression (7).

$$Fct=\beta b \times z1 \qquad (7)$$

The value "βb" of Expression (7) is a predetermined gain, and is referred to as "second gain βb." The second gain βb is set in advance to a value smaller than the first gain βa. The value z1 of Expression (7) is the unsprung displacement z1 at the predicted passing position.

When the position reliability Da at the time of the execution of the preview damping control is lower than the threshold reliability Dath, it is highly likely that the predicted passing position identified in Step 820 is displaced from the original predicted passing position compared with the case in which the position reliability Da is equal to or higher than the threshold reliability Dath. It is thus highly likely that the unsprung displacement z1 at the predicted passing position identified in Step 820 is an inaccurate value. It is highly likely that the target control force Fct calculated based on the above-mentioned unsprung displacement z1 is greatly different from an ideal target control force Fct which is based on an accurate unsprung displacement z1. It is also likely that the preview damping control using such a target control force Fct excites the sprung portion 51.

Thus, in the at least one embodiment, when the position reliability Da is lower than the threshold reliability Dath, the target control force Fct is calculated through use of the second gain βb smaller than the first gain βa used for the calculation of the target control force Fct when the position reliability Da is equal to or higher than the threshold reliability Dath. As a result, in the case in which the position reliability Da is lower than the threshold reliability Dath, the target control force Fct is calculated so that the target control force Fct is smaller compared with the case in which the position reliability Da is equal to or higher than the threshold reliability Dath (the target control force Fct is calculated so that the degree of influence of the unsprung displacement z1, which is obtained at the predicted passing position, on the target control force Fct is reduced). Thus, it is possible to reduce a possibility that the sprung portion 51 is excited, to thereby being capable of preventing the damping performance of the preview damping control for the sprung portion 51 from decreasing.

The calculation processing for the target control force Fct in Step 835 is sometimes referred to as "first calculation processing." The calculation processing for the target control force Fct in Step 850 is sometimes referred to as "second calculation processing."

When the vehicle 30 obtains the position reliability Da in Step 530 of FIG. 5, the vehicle 30 may determine whether or not the position reliability Da is equal to or higher than the threshold reliability Dath. When the position reliability is lower than the threshold reliability Dath, the sprung acceleration ddz2, the stroke H, and the current position of the wheel 31 may not be stored as the travel information. The management server 22 receives only the travel information having the position reliability Da equal to or higher than the threshold reliability Dath, and is thus only required to update the unsprung displacement information based on the received travel information.

The present disclosure is not limited to the at least one embodiment and modification examples described above, and various modification examples can be adopted within the scope of the present disclosure.

First Modification Example

As illustrated in FIG. 9, the unsprung displacement information in the first modification example includes a reliability flag Xac in addition to the block Gd and the unsprung displacement z1. Even when the position reliability Da of the processing data set of the travel information is lower than the threshold reliability Dath, as long as the value of the reliability flag Xac of the matching data set of the unsprung displacement information is "0", the management server 22 updates the unsprung displacement z1 of the matching data set.

The value of the reliability flag Xac is set to "1" when the position reliability Da of the processing data set used for the update is equal to or higher than the threshold reliability Dath, and is set to "0" when the position reliability Da used for the update is lower than the threshold reliability Dath. That is, when the data set of the unsprung displacement information has been updated based on the processing data set having the position reliability Da equal to or higher than the threshold reliability Dath (highly reliable travel information), the value of the reliability flag Xac of this data set is set to "1". Meanwhile, when the data set has not been updated based on the highly reliable travel information, the value of the reliability flag Xac is set to "0". The reliability flag Xac is also referred to as "reliability determination information."

The management server 22 in the first modification example executes an unsprung displacement information update routine of HG. 10 in place of the unsprung displacement information update routine of FIG. 7. The vehicle 30 in the first modification example executes the travel information collection routine of FIG. 5 and the travel information transmission routine of FIG. 6, and executes a preview damping control routine of FIG. 11 in place of the preview damping control routine of FIG. 8.

Figure 10:
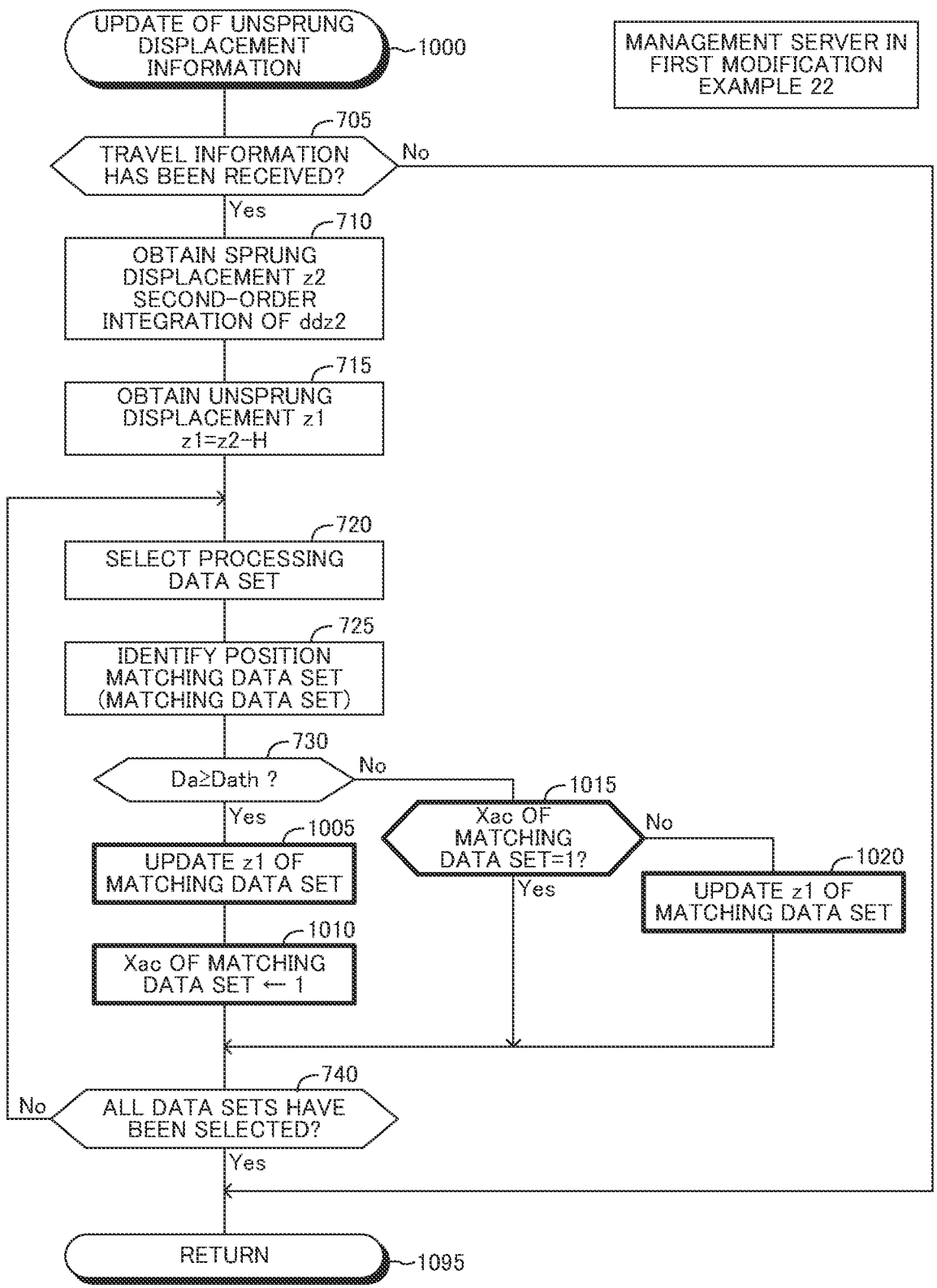
FIG. 10 is a flowchart for illustrating an unsprung displacement information update routine in the first modification example.

First, with reference to FIG. 10, description is given of the unsprung displacement information update routine in the first modification example. A step for executing the same processing as that executed in the step described above is denoted by the same reference numeral as that of the step described above, and description thereof is sometimes omitted.

<Unsprung Displacement Information Update Routine>
The second CPU starts processing from Step 1000 of FIG. 10 at a predetermined timing. When the second CPU makes a determination of "Yes" in Step 705 of FIG. 10, the second CPU executes Step 710 to Step 730 of FIG. 10 in the stated order.

When the second CPU makes a determination of "Yes" in Step 730 of FIG. 10, the second CPU executes Step 1005 and Step 1010. Then, the process proceeds to Step 745 of FIG. 10.

Step 1005: The second CPU updates the matching data set based on the processing data set.

In Step 1005, the second CPU changes a form of the update of the matching data as follows depending on the value of the reliability flag Xac of the matching data set.

When the value of the reliability flag Xac is "1":
The unsprung displacement z1 of the matching data set has already been updated based on the unsprung displacement z1 having high position reliability Da (that is, the highly reliable travel information), and the second CPU thus uses the unsprung displacement z1 of the matching data set in addition to the unsprung displacement z1 of the processing data set to update the unsprung displacement z1 of the matching data set. In more detail, the second CPU overwrites the unsprung displacement z1 of the matching data set with the average value or the weighted average value as in the description of Step 735 of FIG. 7.

When the value of the reliability flag Xac is "0":
The unsprung displacement z1 of the matching data set has not been updated based on an unsprung displacement z1 having high position reliability Da, and the second CPU thus overwrites the unsprung displacement z1 of the matching data set with the unsprung displacement z1 of the processing data set.

Step 1010: The second CPU sets the value of the reliability flag Xac of the matching data set to "1" in order to record a history that the unsprung displacement of the matching data set is updated based on the unsprung displacement z1 having the high position reliability Da. An initial value of the value of the reliability flag Xac is set to "0".

Meanwhile, when the second CPU makes a determination of "No" in Step 730 of FIG. 10, the process proceeds to Step 1015, and the second CPU determines whether or not the value of the reliability flag Xac of the matching data set is "1".

When the value of the reliability flag Xac of the matching data set is "1", the second CPU makes a determination of "Yes" in Step 1015, and does not update the unsprung displacement z1 of the matching data set. Then, the process proceeds to Step 745 of FIG. 10.

Meanwhile, when the value of the reliability flag Xac of the matching data set is "0", the unsprung displacement z1 of the matching data set has not been updated based on an unsprung displacement z1 having high position reliability Da, and the position reliability Da of the processing data set is also low. It is possible to reflect the latest information to the unsprung displacement z1 of the matching data set even when the matching data is updated based on the data set having low position reliability Da while it is not possible to reflect the latest information when the update is not executed. Thus, when the value of the reliability flag Xac of the matching data set is "0", the second CPU makes a determination of "No" in Step 1015, and the process proceeds to Step 1020. Then, the second CPU updates the unsprung displacement z1 of the matching data set based on the unsprung displacement z1 of the processing data set.

As an example of the processing of Step 1020, the second CPU overwrites the unsprung displacement z1 of the matching data set with the unsprung displacement z1 of the processing data set. The second CPU may overwrite the unsprung displacement z1 of the matching data set with the above-mentioned average value or weighted average value.

Further, in Step 1020, the second CPU may execute low-pass filtering, to thereby update the unsprung displacement z1 of the matching data set through use of an unsprung displacement z1 from which a frequency component higher than a predetermined cutoff frequency is removed. A low frequency component of the unsprung displacement z1 is less likely to be influenced by a position displacement than the high frequency component. Thus, it is possible to reduce a displacement amount of the target control force Fct, which is calculated based on the unsprung displacement z1 updated as described above, from the above-mentioned ideal target control force Fct, and it is thus possible to prevent the damping performance of the preview damping control from decreasing.

After that, the process proceeds to Step 745 of FIG. 10. When all of the data sets of the travel information have been selected as the processing data set, the second CPU makes a determination of "Yes" in Step 745 of FIG. 10, and the process proceeds to Step 1095. Then, and the second CPU temporarily finishes this routine.

<Preview Damping Control Routine>

Figure 11:
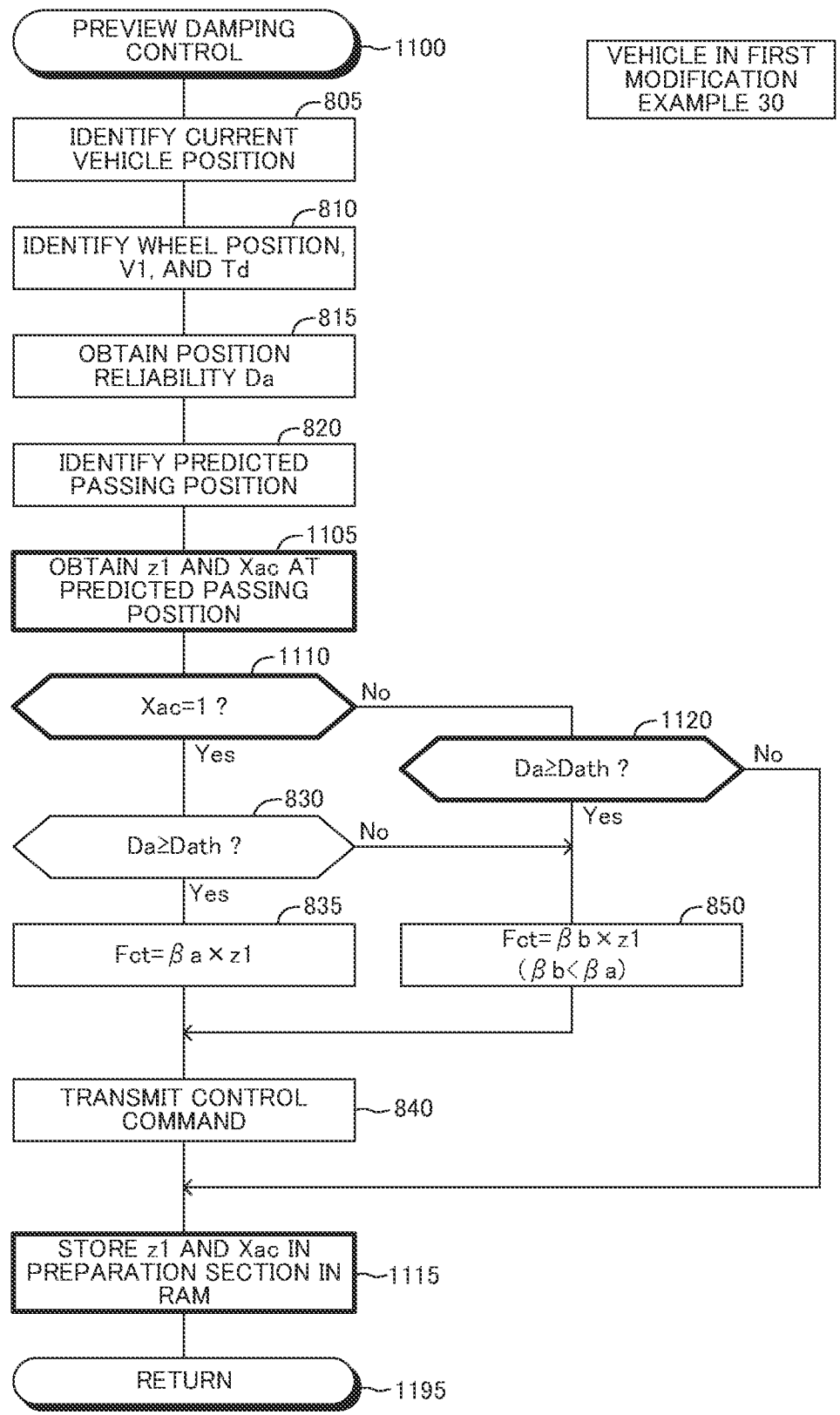
FIG. 11 is a flowchart for illustrating a preview damping control routine in the first modification example.

The first CPU starts processing from Step 1100 of FIG. 11 at a predetermined timing. The first CPU executes Step 805 to Step 820 of FIG. 11 in the stated order, and the process proceeds to Step 1105. The first CPU obtains the unsprung displacement z1 and the reliability flag Xac at the predicted passing position from the unsprung displacements z1 and the reliability flags Xac in the preparation section stored in the RAM in advance in Step 1105, and the process proceeds to Step 1110.

In Step 1110, the first CPU determines whether or not the value of the reliability flag Xac at the predicted passing position is "1". When the value of the reliability flag Xac is "1", the first CPU makes a determination of "Yes" in Step 1110, and the process proceeds to Step 830 of FIG. 11. When the first CPU makes a determination of "Yes" in Step 830 of FIG. 11, the process proceeds to Step 835 of FIG. 11, and the first CPU calculates the target control force Fct through use of the first gain βa (that is, executes the first calculation processing). After that, the first CPU executes Step 840 of FIG. 11, and the process proceeds to Step 1115. In Step 1115, when the predicted passing position reaches the position ahead of the end point of the preparation section by the predetermined distance, the first CPU obtains "the unsprung displacements z1, the position information (X, Y), and the reliability flags Xac" in the preparation section from the unsprung displacement information of the cloud system 20, and stores those pieces of information in the RAM. After that, the process proceeds to Step 1195, and the first CPU temporarily finishes this routine.

Meanwhile, when the first CPU makes a determination of "No" in Step 830 of FIG. 11, the process proceeds to Step 850 of FIG. 11, and the first CPU calculates the target control force Fct through use of the second gain ph (that is, executes the second calculation processing). After that, the process proceeds to Step 840 of FIG. 11.

Meanwhile, when the value of the reliability flag Xac is "0" in the case in which the process proceeds to Step 1110, the first CPU makes a determination of "No" in Step 1110, and the process proceeds to Step 1120. In Step 1120, the first CPU determines whether or not the position reliability Da obtained in Step 815 of FIG. 11 is equal to or higher than the threshold reliability Dath.

When the position reliability Da is equal to or higher than the threshold reliability Dath, the first CPU makes a determination of "Yes" in Step 1120, and the process proceeds to Step 850 of FIG. 11. Meanwhile, when the position reliability Da is lower than the threshold reliability Dath, the first CPU makes a determination of "No" in Step 1120, and does not calculate the target control force Fct. Then, the process proceeds to Step 1115. That is, when the position reliability Da is lower than the threshold reliability Dath, the first CPU does not substantially execute the preview damping control.

The preview damping control described above is summarized as below.

The condition that the value of the reliability flag Xac of the predicted passing position is "0" is referred to as "first position displacement condition." The condition that the position reliability Da during the execution of the preview damping control is lower than the threshold reliability Dath is referred to as "second position displacement condition."

Case 1: When none of the first position displacement condition and the second position displacement condition are satisfied, the first CPU calculates the target control force Fct through use of the first gain βa (see Step 830 of FIG. 11).

Case 2: When any one of the first position displacement condition and the second position displacement condition is satisfied, the first CPU calculates the target control force Fct through use of the second gain βb (see Step 850 of FIG. 11).

Case 3: When both of the first position displacement condition and the second position displacement condition are satisfied, the first CPU does not calculate the target control force Fct, and does not transmit the control command to the active actuator 37.

In this case, the first CPU may calculate the target control force Fct through use of a third gain βc smaller than the second gain βb, and may transmit the control command which is based on this target control force Fct to the active actuator 37.

According to the first modification example, the unsprung displacement z1 may be stored even when the position reliability Da of the processing data set is lower than the threshold reliability Dath, and it is thus possible to register a larger number of the unsprung displacements z1 in the unsprung displacement information than that in the at least one embodiment. As a result, the preview damping control can be executed at a larger number of positions compared with that in the at least one embodiment. Further, the information indicating whether or not the position reliability Da at the time when the vehicle 30 obtains the travel information is equal to or higher than the threshold reliability Dath is stored in the unsprung displacement information as the value of the reliability flag Xac. As a result, it is possible to stepwise reduce the magnitude of the target control force Fct as there increases the possibility that the unsprung displacement z1 at the predicted passing position is inaccurate. Thus, it is possible to reduce the possibility that the damping performance of the preview damping control decreases.

In place of the reliability flag Xac in the first modification example, the position reliability Da of the processing data set used for the update may be stored in the unsprung displacement information.

Second Modification Example

In a second modification example of the present disclosure, the first CPU calculates the target control force Fct based on a feedforward term and a feedback term described below.

First, description is given of an example in a case in which the second modification example is applied to the at least one embodiment. In this case, in the second modification example, only the steps (Step 835 and Step 850) of calculating the target control force Fct of the preview damping control routine of FIG. 8 by the vehicle 30 are different from those in the at least one embodiment.

That is, when the position reliability Da at the time (current time) when the target control force Fct is calculated is equal to or higher than the threshold reliability Dath, the first CPU makes the determination of "Yes" in Step 830 of FIG. 8, and calculates the target control force Fct in accordance with Expression (8).

$$Fct = \beta \times z1 \times \gamma a \times z2 \quad (8)$$

The value "β" of Expression (8) is a gain set in advance, and is referred to as "feedforward gain β." The value "z1" of Expression (8) is the unsprung displacement z1 at the predicted passing position. The term "β×z1" is referred to as "feedforward term." In the at least one embodiment, only this feedforward term is used to calculate the target control force Fct.

The value "γa" of Expression (8) is a gain set in advance, and is referred to as "feedback gain γa." The value "z2" of Expression (8) is the sprung displacement z2 at the time when the target control force Fct is calculated. The term "γa×z2" is referred to as "feedback term." The sprung displacement z2 is obtained through the second-order integration of the sprung acceleration ddz2 obtained by the vertical acceleration sensor 42 at the current time. This feedback term is a component of the target control force Fct required to reduce the vibration of the sprung portion 51 at the time when the target control force Fct is calculated (that is, the current time).

Meanwhile, when the position reliability Da at the current time is lower than the threshold reliability Dath, the first CPU makes the determination of "No" in Step 830 of FIG. 8, and calculates the target control force Fct in accordance with Expression (9).

$$Fct = \beta \times z1 + \gamma b \times z2 \quad (9)$$

The feedback gain γb of Expression (9) is set to a value larger than the feedback gain γa of Expression (9).

When the position reliability Da is lower than the threshold reliability Dath, it is highly likely that the unsprung displacement z1 at the predicted passing position is inaccurate, but the sprung displacement z2 at the current time is the value obtained regardless of the precision of the current position of the vehicle 30, and is thus highly likely to be accurate. According to the second modification example, when the position reliability Da is lower than the threshold reliability Dath, the magnitude of the component of the feedback term which uses the sprung displacement z2 with respect to the unsprung displacement z1 at the predicted passing position can be made larger than that in the case in which the position reliability Da is equal to or higher than the threshold reliability Dath. As a result, the target control force Fct is calculated so that the degree of influence of the unsprung displacement z1, which is obtained at the predicted passing position, on the target control force Fct is reduced. Thus, it is possible to prevent the decrease in damping performance of the preview damping control for the sprung portion 51.

The second modification example can also be applied to the first modification example.

In this case, the first CPU operates as follows.
The first CPU calculates the target control force Fct in accordance with Expression (8) in Step 830 of FIG. 11 of the preview damping control routine of FIG. 11.
The first CPU calculates the target control force Fct in accordance with Expression (9) in Step 835 of FIG. 11.
When the first CPU makes a determination of "No" in Step 1120 of FIG. 11, the first CPU calculates the target control force Fct in accordance with Expression (10), and the process proceeds to Step 840 of FIG. 11.

$$Fct = \beta \times z1 + \gamma c \times z2 \quad (10)$$

The feedback gain γc of Expression (10) is set to a value larger than the feedback gain γb of Expression (9).

In the second modification example, there may be used any one of the sprung speed dz2, the sprung acceleration ddz2, the unsprung displacement z1, the unsprung speed dz1, and the unsprung acceleration ddz1 at the time of the calculation of the target control force Fct in place of the sprung displacement z2 of the feedback term. The sprung speed dz2 is obtained through integration of the sprung acceleration ddz2 measured by the vertical acceleration sensor 42. The unsprung displacement z1 is obtained by subtracting the stroke H measured by the stroke sensor 43 from the sprung displacement z2 obtained through the second-order integration of the sprung acceleration ddz2 measured by the vertical acceleration sensor 42. The unsprung speed dz1 is obtained by differentiating the unsprung displacement z1 obtained as described above. The unsprung acceleration ddz1 is obtained through second-order differentiation of the unsprung displacement z1 obtained as described above. The sprung displacement z2, the sprung speed dz2, and the sprung acceleration ddz2 are values indicating a vertical displacement state of the sprung portion 51, and are collectively referred to as "sprung state quantities." The unsprung displacement z1, the unsprung speed dz1, and the unsprung acceleration ddz1 are values indicating a vertical displacement state of the unsprung portion 50, and are collectively referred to as "unsprung state quantities."

Further, the feedforward gain β in the second modification example is set to the constant value, but the feedforward gain β may be set to any one of the gain Pa and the gain βb depending on the situation in the same manner as in the at least one embodiment and the first modification example. In this case, when the first CPU makes a determination of "No" in Step 1120 of FIG. 11, the first CPU sets the feedforward gain β of Expression (10) to "0", and calculates the target control force Fct in accordance with Expression (10).

Third Modification Example

A third modification example of the present disclosure is applied to the first modification example. In the third modification example, when the value of the reliability flag Xac at the predicted passing position is "0", the first CPU obtains the unsprung displacement z1 at the predicted passing position from the planner information stored in the planner information storage 47 of FIG. 1, and calculates the target control force Fct based on the unsprung displacement z1.

Description is now given of the planner information.

The planner information is information including map data to be used by the first CPU to determine the path on which the vehicle 30 travels. As an example, when a driver of the vehicle 30 inputs an arrival point before the vehicle 30 starts traveling, the first CPU refers to the planner information to determine a path (trave route) from the current position to the arrival point. The planner information is information provided by a business entity that provides the planner information, and is stored in advance in the storage device 41a (planner information storage 47) of the vehicle 30. An update frequency of the planner information is lower than an update frequency of the unsprung displacement z1 (X, Y). The planner information further includes data sets each formed by associating the position information and a value (for example, the unsprung displacement z1, a road surface displacement z0, or the altitude) capable of identifying the unsprung displacement z1 at the position indicated by the position information with each other. The road surface displacement z0 is a value indicating a vertical displacement of the road surface 55.

Figure 12:
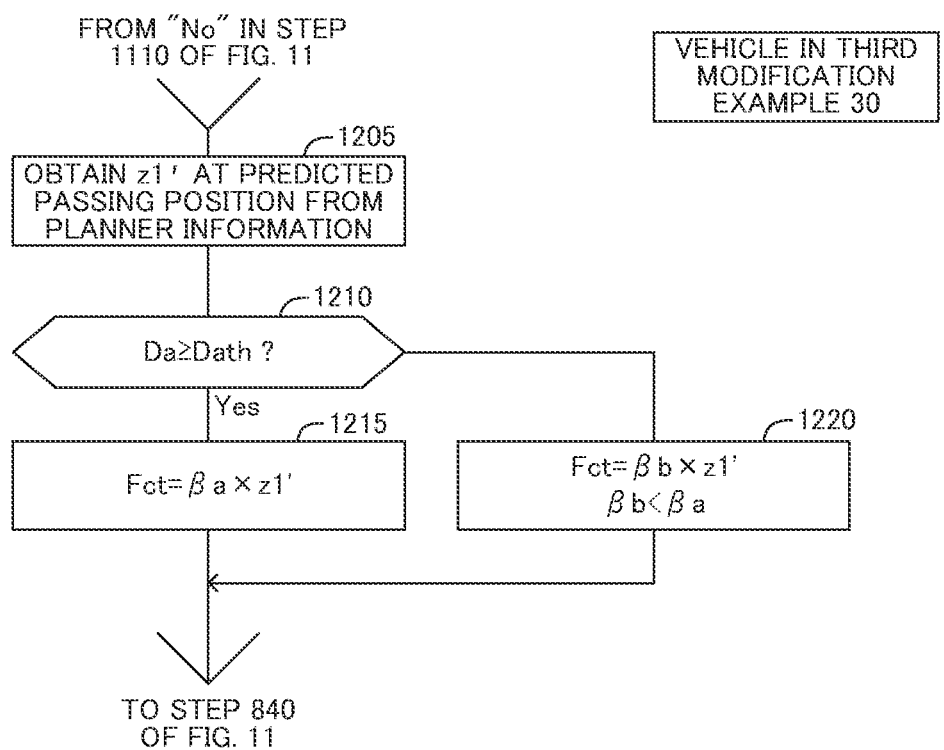
FIG. 12 is a flowchart for illustrating a part of processing of a preview damping control routine in a third modification example of the at least one embodiment of the present disclosure.

The first CPU in the third modification example executes the preview damping control routine each time a predetermined period elapses. The preview damping control routine in the third modification example is different from the preview damping control routine of FIG. 11 in processing executed after the determination of "No" in Step 1110 of FIG. 11. With reference to FIG. 12, description is now given of this processing.

When the first CPU makes the determination of "No" in Step 1110 of FIG. 11, the process proceeds to Step 1205 of FIG. 12, and the first CPU obtains, from the planner information, the unsprung displacement z1 at the predicted passing position. This unsprung displacement z1 at the predicted passing position is hereinafter referred to as "unsprung displacement z1'" in order to distinguish this unsprung displacement z1 from the unsprung displacement z1 at the predicted passing position obtained in Step 1105 of FIG. 11.

After that, the process proceeds to Step 1210, and the first CPU determines whether or not the position reliability Da at the current time is equal to or higher than the threshold reliability Dath. When the position reliability Da at the current time is equal to or higher than the threshold reliability Dath, the first CPU makes a determination of "Yes" in Step 1210, and the process proceeds to Step 1215. In Step 1215, the first CPU applies the unsprung displacement z1' to Expression (6), to thereby calculate the target control force Fct. After that, the process proceeds to Step 840 of FIG. 11.

Meanwhile, when the position reliability Da at the current time is less than the threshold reliability Dath, the first CPU makes a determination of "No" in Step 1210, and proceeds to Step 1220. In Step 1220, the first CPU applies the unsprung displacement z1' to Expression (7), to thereby calculate the target control force Fct. After that, the process proceeds to Step 840 of FIG. 11.

As described above, when the value of the reliability flag Xac at the predicted passing position is "0", the first CPU obtains the unsprung displacement z1 at the predicted passing position based on the planner information. As a result, the target control force Fct is calculated so that the degree of influence of the unsprung displacement z1 at the predicted passing position, which is obtained from the unsprung displacement information, on the target control force Fct is reduced. The planner information has the update frequency lower than that of the unsprung displacement information. Thus, the unsprung displacement z1 obtained from the planner information may not be the latest. However, the unsprung displacement z1 at the predicted passing position obtained from the planner information is highly likely to be more accurate than the unsprung displacement z1 at the predicted passing position having the value "0" of the reliability flag Xac. Thus, it is possible to prevent the decrease in damping performance of the preview damping control for the sprung portion 51.

Fourth Modification Example

A part of the vehicles 30 may be vehicles that are dedicated for measurement (general vehicles), which collect the travel information but do not execute the preview damping control. The vehicle dedicated for measurement is different from a preview vehicle capable of executing the preview damping control in a point that the vehicle does not include the active actuators 37 of FIG. 3. Further, the vehicle dedicated for measurement executes the routines of FIG. 5 and FIG. 6, but does not execute the routine of FIG. 8. The vehicle dedicated for measurement is sometimes referred to as "first vehicle." The preview vehicle is sometimes referred to as "second vehicle."

Fifth Modification Example

It is not always required to store the unsprung displacement information in the storage media 24, and it is only required to store the unsprung displacement information in the storage device 41a of the vehicle 30. In this case, the function of the management server 22 is implemented in the vehicle 30. That is, when the process proceeds to Step 615 of FIG. 6, the first CPU of the vehicle 30 is configured to execute, in place of Step 615, Step 710 to Step 740 of FIG. 7 or Step 710 to Step 730 and Step 1005 and Step 1010 of FIG. 10.

Further, the unsprung displacement information may be stored in the storage device 41a of the vehicle dedicated for measurement in the fourth modification example. In this case, the function of the management server 22 is implemented in the vehicle dedicated for measurement. The preview vehicle obtains the unsprung displacement information from the vehicle dedicated for measurement, and executes the preview damping control.

Sixth Modification Example

When the traveling course (traveling route) of the vehicle 30 is determined in advance, the first CPU may download, in advance, the position information and the unsprung displacements z1 on the traveling path from the unsprung displacement information stored in the storage media 24, and may store the position information and the unsprung displacements z1 in the storage device 41a before the vehicle 30 starts the travel on the traveling course.

Seventh Modification Example

In place of the unsprung displacements z1, the road surface displacements z0 may be stored in the unsprung displacement information. In this case, the first CPU uses the road surface displacement z0 in place of the unsprung displacement z1 for the calculation of the target control force Fct.

The road surface displacement z0 can be measured by the Lidar 46, and thus the vehicle 30 stores the road surface displacement z0 measured by the Lidar 46 as the measurement value of the travel information, and the travel information is transmitted to the management server 22. The road surface displacement z0 can also be measured by a camera sensor, a radar, or the like other than the Lidar 46.

In place of the unsprung displacement z1, the unsprung speed dz1 may be stored in the unsprung displacement information. In this case, the second CPU differentiates the unsprung displacement z1 obtained in Step 715 of FIG. 7 with respect to time, to thereby obtain the unsprung speed dz1. Further, the first CPU integrates the unsprung speed dz1 obtained in Step 825 of FIG. 8, to thereby obtain the unsprung displacement z1. Similarly, in place of the unsprung displacement z1, "a road surface displacement speed dz0 being a time derivative of the road surface displacement z0" may be stored in the unsprung displacement information.

Further, the unsprung displacement z1 and the unsprung speed dz1 may be stored in the unsprung displacement information. In this case, the second CPU calculates the target control force Fct through use of Expression (3). Even in this case, the gains β1 and β2 used in Step 850 of FIG. 8 and FIG. 11 are set to values smaller than the gains β1 and β2 used in Step 835 of FIG. 8 and FIG. 11, respectively. Similarly, the gains β1 and β2 used in Step 1220 of FIG. 12 are set to values smaller than the gains β1 and β2 used in Step 1215 of FIG. 12, respectively. Still similarly, the road surface displacement z0 and the road surface displacement speed dz0 may be stored in the unsprung displacement information.

The unsprung displacement z1, the unsprung speed dz1, the road surface displacement z0, and the road surface displacement speed dz0 are sometimes collectively referred to as "road surface displacement-related values."

In the at least one embodiment and the modification examples described above, the vehicle 30 transmits, to the management server 22, the sprung acceleration ddz2 and the stroke H as the measurement values of the travel information, but the vehicle 30 may transmit, to the management server 22, the unsprung displacement z1 calculated based on the sprung acceleration ddz2 and the stroke H as the measurement value of the travel information.

Eighth Modification Example

The vehicle speed V1 and the traveling direction Td are obtained based on the current position of the vehicle 30 obtained by the GNSS receiver 44, but the configuration is not limited to this example. For example, the vehicle 30 may obtain the vehicle speed V1 based on the rotation speed of the wheel 31 measured by a wheel speed sensor (not shown). The vehicle 30 may obtain the traveling direction Td based on a yaw rate acting on the vehicle 30, which is measured by a yaw rate sensor (not shown), and the vehicle speed V1.

Ninth Modification Example

The suspension 33 may be any type of suspension as long as the wheel 31 can vertically be displaced with respect to the vehicle body 30a (the vehicle body 30a can be vertically displaced with respect to the wheel 31). Further, the suspension spring 36 may be any spring such as a compression coil spring and an air spring.

The active actuator 37 is provided to each of the four wheels 31 in the at least one embodiment, but it is only required to provide the active actuator 37 to at least one wheel 31.

The control force generation device is only required to be an actuator capable of generating the vertical control force Fc for damping the sprung portion 51 based on "the control command including the target control force Fct."

The control force generation device may be an active stabilizer device (not shown). For example, the active stabilizer device provided to the right front wheel 31FR generates a control force in a direction opposite to that of a control force generated by the active stabilizer provided to the left front wheel 31FL. The configuration of the active stabilizer is well known as described in Japanese Patent Application Laid-open No. 2009-96366, and is hereby incorporated by reference into this application.

The control force generation device may be a device for generating the vertical control force Fc through use of the geometry of the suspension 33 by increasing and reducing a braking force and a driving force acting on each wheel 31. The configuration of this device is well known as described in Japanese Patent Application Laid-open No. 2016-107778, and is hereby incorporated by reference into this application. In this case, the first CPU calculates the braking force and the driving force for generating the target control force Fct.

Further, the control force generation device may be the shock absorber 35 of the variable damping force type. In this case, the first CPU controls the damping coefficient C of the shock absorber 35 so that the damping force of the shock absorber 35 changes in accordance with a value corresponding to the target control force Fct.

What is claimed is:

1. A damping control system comprising:
   a first vehicle;
   a second vehicle, which is one of the same vehicle as the first vehicle and a vehicle different from the first vehicle; and
   a storage device,
   wherein the storage device is installed in any one of the first vehicle, the second vehicle, and a place other than the first vehicle and the second vehicle,
   wherein the storage device includes a related value information storage configured to store related value information formed by associating a position of a road surface and a road surface displacement-related value with each other, the road surface displacement-related value being a value related to a road surface displacement, which is a displacement in a vertical direction of the road surface at the position of the road surface,
   wherein the first vehicle is configured to:
      measure a change value being a value that changes in accordance with the road surface displacement of the road surface on which the first vehicle travels, and obtain position information indicating a measurement position being a position of the road surface at which the change value is measured and position reliability being reliability of the position information; and
      provide, to the storage device, travel information formed by associating the change value, the position information, and the position reliability with each another,
   wherein the storage device is configured to:
      execute first update processing of updating the road surface displacement-related value corresponding to the measurement position of the related value information based on a road surface displacement-related value identified based on the change value of the travel information, when the position reliability of the travel information is equal to or higher than a predetermined threshold reliability; and
      execute second update processing of updating the related value information in a manner different from the manner of the first update processing, when the position reliability of the travel information is lower than the predetermined threshold reliability, wherein the second vehicle includes a control force generation device configured to generate a control force in the vertical direction for damping a sprung portion of the second vehicle such that the control force is generated between each of at least one wheel of the second vehicle and a vehicle body part corresponding to a position of the at least one wheel, and wherein the second vehicle is configured to:
  obtain, through use of the related value information stored in the storage device, a control related value being a road surface displacement-related value at a predicted passing position, at which the at least one wheel is predicted to pass at a time when a predetermined period elapses after a current time; and
  execute preview damping control of controlling the control force generation device based on a target control force for damping the sprung portion, which is calculated based on the control related value, wherein, in the related value information, the road surface displacement-related value at the position of the road surface and reliability determination information, which indicates that the road surface displacement-related value has been updated based on highly reliable travel information, are associated with each other, the highly reliable travel information being travel information having the position reliability equal to or higher than the predetermined threshold reliability, wherein, when the related value information is to be updated in the first update processing, regardless of the reliability determination information which is associated with the measurement position indicated by the position information of the travel information in the related value information, the storage device is configured to update the road surface displacement-related value of the related value information which corresponds to the measurement position, based on a road surface displacement-related value identified based on the change value of the travel information, and to change the reliability determination information of the related value information which corresponds to the measurement position to a value indicating that the road surface displacement-related value has been updated based on the highly reliable travel information, and wherein the storage device is configured to:
  determine, when the related value information is to be updated in the second update processing, whether the road surface displacement-related value of the related value information which corresponds to the measurement position has been updated based on the highly reliable travel information, through use of the reliability determination information associated with the measurement position in the related value information;
  avoid updating the related value information, when it is determined that the road surface displacement-related value has been updated based on the highly reliable travel information; and
  update the road surface displacement-related value of the related value information which corresponds to the measurement position, based on the road surface displacement-related value identified based on the change value of the travel information, when it is determined that the road surface displacement-related value has not been updated based on the highly reliable travel information.

2. The damping control system according to claim 1, wherein, in the second update processing, when it is determined that the road surface displacement-related value has not been updated based on the highly reliable travel information, the storage device is configured to update the road surface displacement-related value of the related value information which corresponds to the measurement position, based on a frequency component of the road surface displacement-related value identified based on the change value of the travel information, the frequency component being lower than a predetermined cutoff frequency.

3. The damping control system according to claim 1, wherein the second vehicle is configured to:
  determine whether the control related value has been updated based on the highly reliable travel information, by referring to the reliability determination information of the control related value;
  execute first calculation processing of calculating the target control force based on at least the control related value, when it is determined that the control related value has been updated based on the highly reliable travel information; and
  execute second calculation processing of calculating the target control force so that a degree of influence of the control related value on the target control force is lower than the degree of influence in the first calculation processing, when it is determined that the control related value has not been updated based on the highly reliable travel information.

4. The damping control system according to claim 3, wherein, in the first calculation processing and the second calculation processing, the second vehicle is configured to calculate the target control force by multiplying a predetermined gain and the control related value by each other, and wherein the predetermined gain to be used in the second calculation processing is set to a value smaller than the predetermined gain to be used in the first calculation processing.

5. The damping control system according to claim 3, wherein, in the first calculation processing and the second calculation processing, the second vehicle is configured to calculate the target control force by adding a feedforward term and a feedback term to each other, the feedforward term being obtained by multiplying a predetermined feedforward gain and the control related value by each other, the feedback term being obtained by multiplying a predetermined feedback gain and one of an unsprung state quantity indicating a current displacement state of an unsprung portion of the second vehicle in the vertical direction and a sprung state quantity indicating a current displacement state of a sprung portion of the second vehicle in the vertical direction by each other, and wherein the feedback gain to be used in the second calculation processing is set to a value larger than the feedback gain to be used in the first calculation processing.

6. The damping control system according to claim 5, wherein the feedforward gain to be used in the second calculation processing is set to a value smaller than the feedforward gain to be used in the first calculation processing.

7. The damping control system according to claim 3, wherein the second vehicle includes a planner information storage configured to store planner information being information which is different from the related value information, and in which a planner position information and the road surface displacement-related value corresponding to a position indicated by the planner position information are associated with each other so that the planner information is used to determine a path on which the vehicle travels, and wherein the second vehicle is configured to:
  calculate, in the first calculation processing, the target control force based on the control related value obtained from the related value information; and
  obtain, in the second calculation processing, the road surface displacement-related value at the predicted passing position from the planner information, and calculate the target control force based on the obtained road surface displacement-related value.

* * * * *